US011683747B2

(12) United States Patent
Hall et al.

(10) Patent No.: US 11,683,747 B2
(45) Date of Patent: Jun. 20, 2023

(54) SYSTEM AND METHOD FOR PRIORITIZED MOBILITY TO ACCESS EDGE SERVERS

(71) Applicant: QUALCOMM Incorporated, San Diego, CA (US)

(72) Inventors: Edward Robert Hall, Bristol (GB); Tom Chin, San Diego, CA (US); Alan Soloway, Erie, CO (US); Ajith Tom Payyappilly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 17/147,404

(22) Filed: Jan. 12, 2021

(65) Prior Publication Data

US 2021/0219220 A1 Jul. 15, 2021

Related U.S. Application Data

(60) Provisional application No. 62/960,531, filed on Jan. 13, 2020.

(51) Int. Cl.
*H04W 4/00* (2018.01)
*H04W 48/18* (2009.01)
(Continued)

(52) U.S. Cl.
CPC ....... *H04W 48/18* (2013.01); *H04W 36/0085* (2018.08); *H04W 36/165* (2013.01)

(58) Field of Classification Search
CPC ............. H04W 48/18; H04W 36/0085; H04W 36/165; H04W 48/20; H04W 36/0061; H04W 36/00835

(Continued)

(56) References Cited

U.S. PATENT DOCUMENTS

2017/0324561 A1\* 11/2017 Shekh-Yusef ............. H04L 9/30
2018/0049056 A1\* 2/2018 Chen ..................... H04W 76/27
(Continued)

FOREIGN PATENT DOCUMENTS

WO 2019011408 A1 1/2019

OTHER PUBLICATIONS

Draft ETSI GR MEC 018 V0.3.4 (Jun. 2017) "Mobile Edge Computing (MEC); End to End Mobility Aspects," Jun. 23, 2017 (Jun. 23, 2017), Group Report, pp. 1-53, XP055430420, 650 Route des Lucioles F-06921 Sophia Antipolis Cedex France, Retrieved from the Internet: URL: https://docbox.etsi.org/ISG/MEC/70-Draft/0018E2EMobility/MEC-0018E2EMobilityv034.docx [retrieved on Nov. 30, 2017] paragraph [04.1]—paragraph [04.2].

(Continued)

*Primary Examiner* — Marcos Batista
(74) *Attorney, Agent, or Firm* — Arent Fox, LLP

(57) ABSTRACT

In an aspect of the disclosure, a method, a computer-readable medium, and an apparatus are provided. The apparatus may be a user equipment (UE). The UE may be configured to transmit a message indicating an identifier (ID) associated with an application to a first edge computing system; receive first information associated with the application in response to transmitting the message, the first information indicating whether at least one second edge computing system configured to provide the application is accessible through at least one cell; and determine a set of cells through which the at least one second edge computing system is accessible based on the first information.

30 Claims, 13 Drawing Sheets

(51) Int. Cl.
  *H04W 36/00* (2009.01)
  *H04W 36/16* (2009.01)
(58) Field of Classification Search
  USPC .......................................... 370/328; 455/312
  See application file for complete search history.

(56) References Cited

U.S. PATENT DOCUMENTS

| | | |
|---|---|---|
| 2019/0246252 A1 | 8/2019 | Rasmusson et al. |
| 2019/0373516 A1* | 12/2019 | Caldenhoven ........ H04W 36/12 |
| 2021/0103481 A1 | 4/2021 | Bernat et al. |
| 2021/0168685 A1 | 6/2021 | Dowlatkhah et al. |

OTHER PUBLICATIONS

International Search Report and Written Opinion—PCT/US2021/013243—ISA/EPO—Apr. 30, 2021.

* cited by examiner

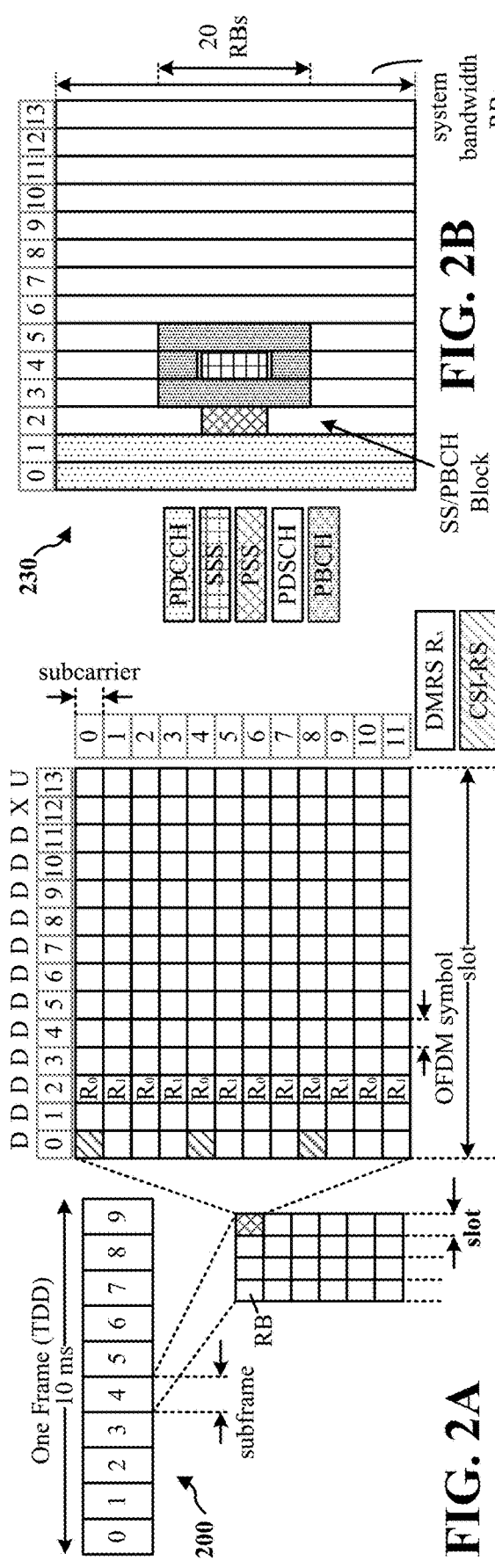
FIG. 2A
FIG. 2B
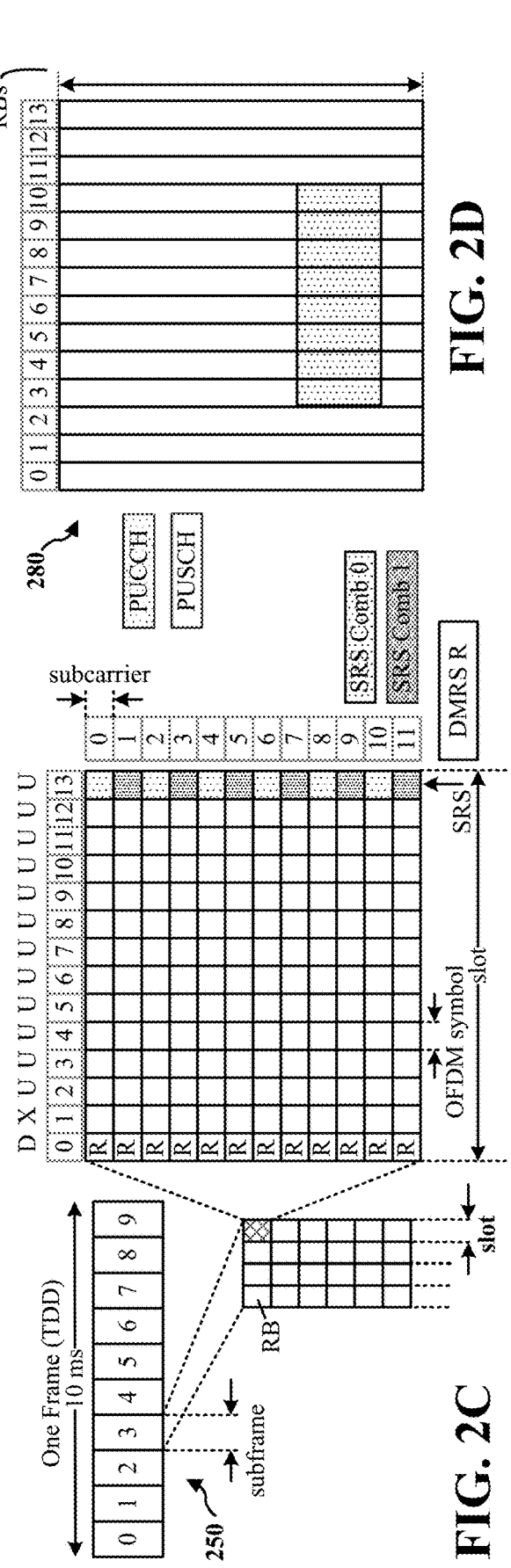
FIG. 2C
FIG. 2D

SYSTEM AND METHOD FOR PRIORITIZED MOBILITY TO ACCESS EDGE SERVERS

CROSS REFERENCE TO RELATED APPLICATION

This application claims the benefit of U.S. Provisional Application Ser. No. 62/960,531, entitled "SYSTEM AND METHOD FOR PRIORITIZED MOBILITY TO ACCESS EDGE SERVERS" and filed on Jan. 13, 2020, the entirety of which is incorporated herein by reference.

BACKGROUND

Technical Field

The present disclosure relates generally to communication systems, and more particularly, to a user equipment configured for prioritized mobility to access edge computing systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

User equipment (UE) frequently utilize services, applications, and other content that are provided as functions through cloud computing, such as data storage and various other computer system resources that are accessible over the Internet at one or more data centers. One cloud system may include many functions at many servers that are distributed across several different geographic locations, for example, in order to scale with an increasing amount of services and content, as well as an increasing number of users.

However, distribution of functions across different geographic locations may increase the signal path complexities, such as distance and/or number of hops between a server location and a UE. The latency in accessing a function at a cloud may increase in proportion to the signal path complexities. For example, the further the physical geographic location of a server from a UE, the greater the duration experienced by the UE in accessing a function available at that server.

Edge computing may reduce signal path complexities by providing various functions at servers that are relatively closer in proximity to UEs accessing such functions. Accordingly, edge computing may reduce the latency experienced by UEs relative to cloud computing. In order for a radio access network (RAN) to provide a UE with access an edge server, a cell of the RAN on which the UE operates should be connected with the edge server. However, some cells of the RAN may not be connected with an edge server that provides a function requested by a UE. Therefore, a need exists for prioritizing access and mobility toward cells providing access to edge servers with desired functions over cells that do not provide access to edge servers with the desired functions.

In an aspect of the disclosure, a method, a computer-readable medium, and an apparatus are provided. The apparatus may be a UE. The UE may be configured to transmit a message indicating an identifier (ID) associated with an application to a first edge computing system; receive first information associated with the application in response to transmitting the message, the first information indicating whether at least one second edge computing system configured to provide the application is accessible through at least one cell; and determine a set of cells through which the at least one second edge computing system is accessible based on the first information.

In another aspect of the disclosure, a method, a computer-readable medium, and an apparatus are provided. The apparatus may be a base station. The base station may be configured to receive at least one measurement report from a UE configured to receive an application from a first edge computing system, the at least one measurement report indicating at least one first measurement associated with a second cell and at least one second measurement associated with a third cell; determine whether the first edge computing system is accessible through at least one of the second cell or the third cell; and transmit an instruction to the UE in response to the at least one measurement report, the instruction causing handover of the UE to the second cell instead of the third cell when the first edge computing system is accessible through the second cell and inaccessible through the third cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
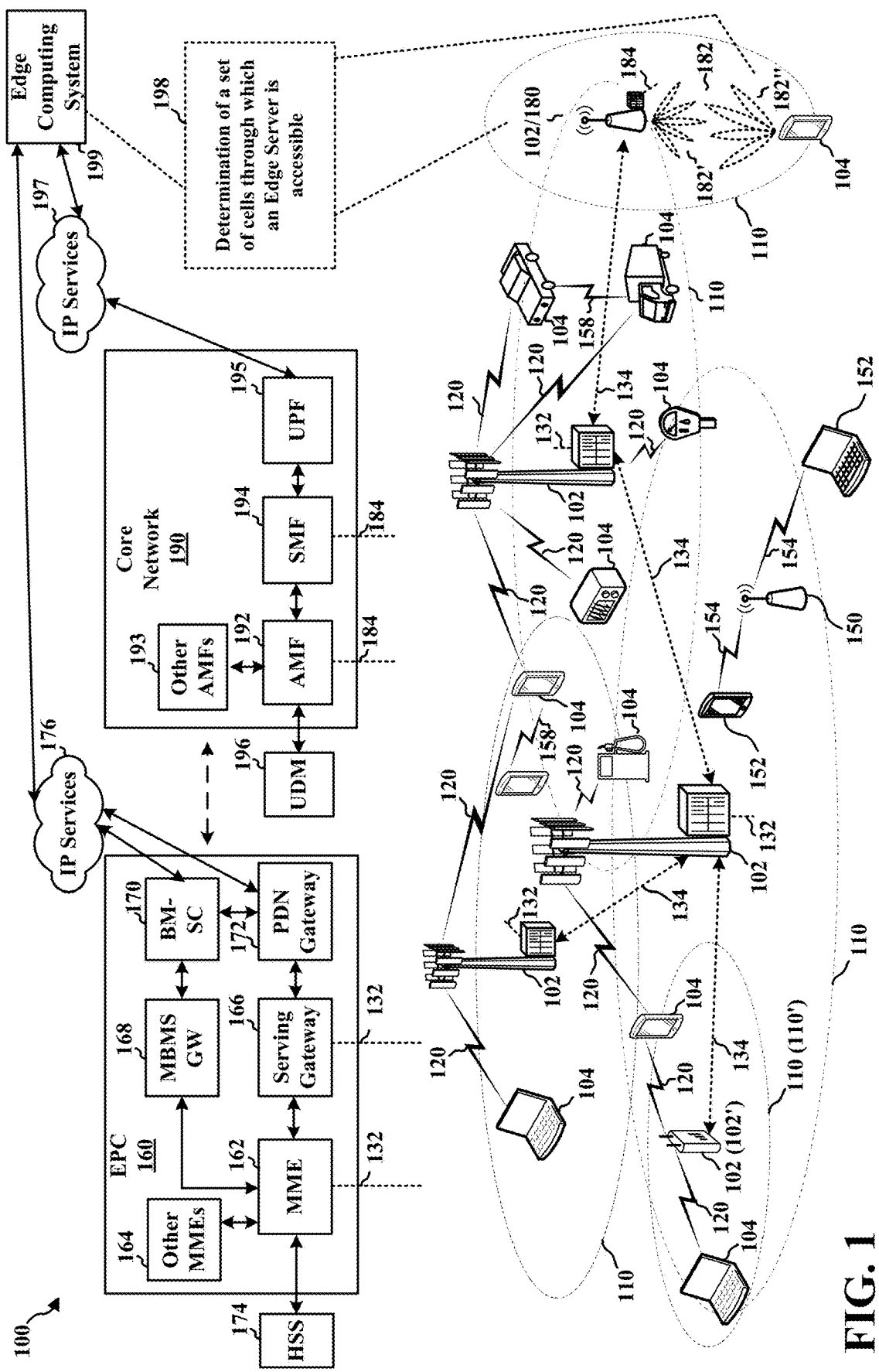
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Cloud computing provides remote access to various functions that provide services, applications, and other content or resources. For example, cloud computing may provide functions for data storage and other computing resources. One cloud computing system may include many functions at many servers that are distributed across several different geographic locations, for example, in order to scale with an increasing amount of services and content, as well as an increasing number of users.

A cloud computing systems that is geographically located relatively proximate to end users may be designated as an edge computing system. An edge computing system may include one or more of an Edge Data Network Configuration Server, an Edge Enabler Server, and one or more Edge Application Servers. The Edge Data Network Configuration may provide configuration information associated with the Edge Data Network, which may include the Edge Enabler Server and one or more Edge Application Servers.

The Edge Enabler Server may provide information associated with edge applications, which may include services and/or other content. For example, the Edge Enabler Server may provide information indicating the availability and related configuration information for one or more edge applications. Further, the Edge Enabler Server may expose capabilities of the wireless communications system and access network 100 (e.g., including a 3GPP network) to edge applications. The one or more Edge Application Servers may provide the one or more edge applications, which may include various services and/or other content.

Referring again to FIG. 1, an edge computing system 199 may be accessible by through the Internet (e.g., through IP services 176, 197). The edge system 199 may include one or more servers or data centers, such as an Edge Data Network Configuration Server, an Edge Enabler Server, and/or one or more Edge Application Servers. The UE 104 may be configured with a client (e.g., an Edge Enabler Client) that enables discovery of edge applications and provisions configuration information so that the UE 104 may utilize the one or more applications provided by the Edge Application Server.

In order to access edge applications, a cell on which a UE operates should be connected to the edge computing system 199 (e.g., at least connected to the Edge Application Server). However, not all cells may be connected with the edge computing system 199. Therefore, the UE may selectively connect with a cell through which the edge computing system 199 is available when the UE uses an edge application.

In certain aspects, the UE 104 and/or the base station 102/180 may be configured to determine a set of cells through which an Edge Application Server is accessible (198). According to one configuration, the UE 104 may transmit a message indicating an identifier (ID) associated with an application to the edge computing system 199, such as to the Edge Data Network Configuration Server. The UE 104 may receive coverage area information associated with the application in response to transmitting the message. The coverage area information may indicate, for example, whether the edge computing system 199 (e.g., the Edge Application Server) configured to provide the application is accessible through at least one cell, such as a cell provided by a base station 102/180. Based on the coverage area information, the UE 104 may determine the set of cells through which the edge computing system 199 configured to provide the application (e.g., the Edge Application Server) is accessible (198).

According to another configuration, the base station 102/180 may provide a cell on which the UE 104 operates, and the UE 104 may be configured to receive an application from the edge computing system 199. The base station 102/180 may determine a set of cells neighboring the base station 102/180 through which the edge computing system 199 (e.g., the Edge Application Server) is accessible (198). When the base station 102/180 is to handover the UE 104, such as when the base station 102/180 receives a measurement report from the UE 104, the base station 102/180 may handover the UE 104 to one of the determined set of cells, instead of another cell through which the edge computing system 199 is inaccessible.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
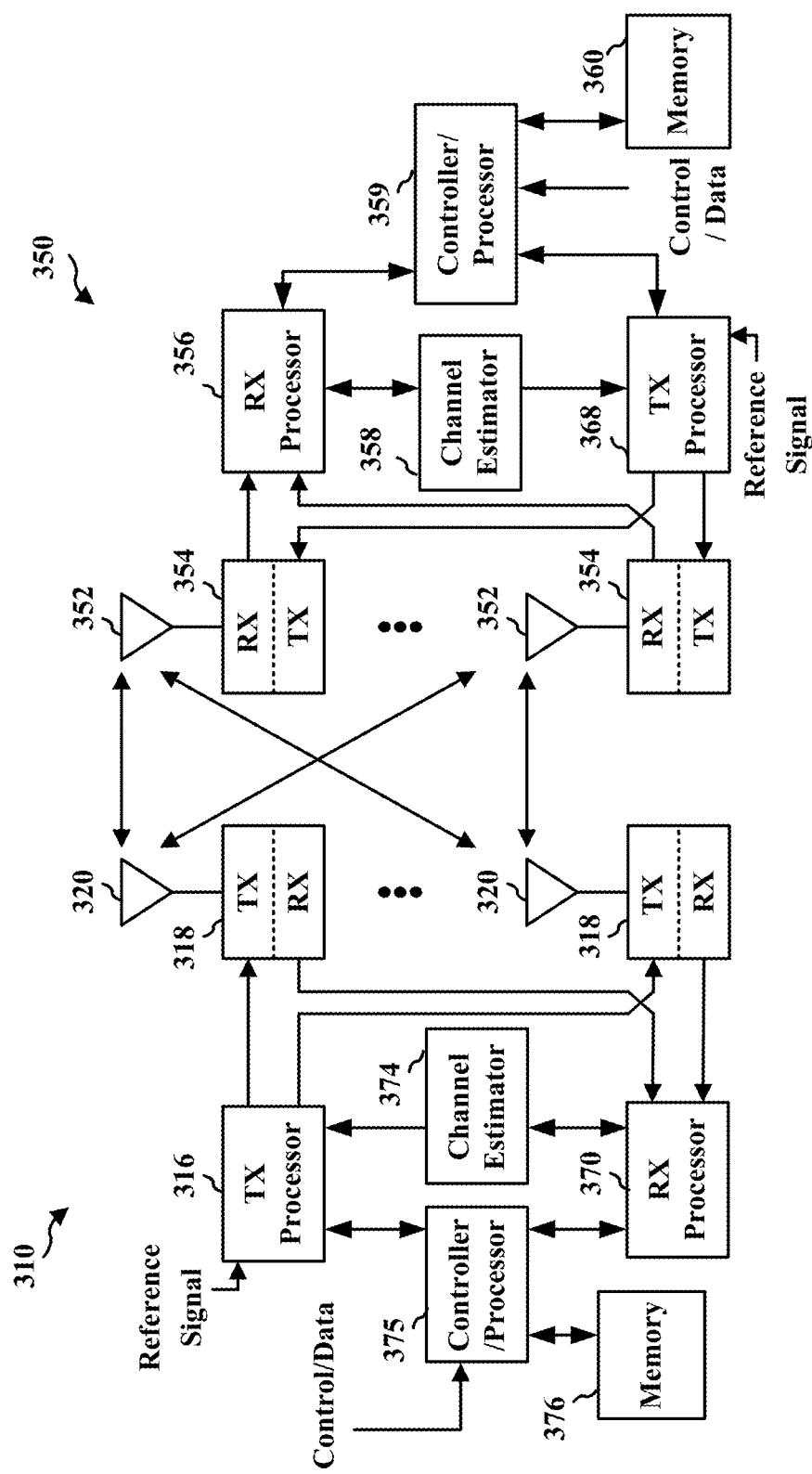
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with (198) of FIG. 1.

In some other aspects, at least one of the TX processor 316, the RX processor 370, and the controller/processor 375 may be configured to perform aspects in connection with (198) of FIG. 1.

Cloud computing provides remote access to various functions that provide services, applications, and other content or resources. For example, cloud computing may provide functions for data storage and other computing resources. One cloud computing system may include many functions at many servers that are distributed across several different geographic locations, for example, in order to scale with an increasing amount of services and content, as well as an increasing number of users.

A cloud computing systems that is geographically located relatively proximate to end users may be designated as an edge computing system. An edge computing system may include one or more of an Edge Data Network Configuration Server, an Edge Enabler Server, and one or more Edge Application Servers. The Edge Data Network Configuration may provide configuration information associated with the Edge Data Network, which may include the Edge Enabler Server and one or more Edge Application Servers.

The Edge Enabler Server may provide information associated with edge applications, which may include services and/or other content. For example, the Edge Enabler Server may provide information indicating the availability and related configuration information for one or more edge applications. Further, the Edge Enabler Server may expose capabilities of a cellular network (e.g., a 3GPP network) to edge applications. The one or more Edge Application Servers may provide the one or more edge applications, which may include various services and/or other content.

UEs frequently utilize services, applications, and other content that are provided as functions through cloud computing, such as data storage and various other computer system resources that are accessible over the Internet at one or more data centers. One cloud system may include many functions at many servers that are distributed across several different geographic locations, for example, in order to scale with an increasing amount of services and content, as well as an increasing number of users.

However, distribution of functions across different geographic locations may increase the signal path complexities, such as distance and/or number of hops between a server location and a UE. The latency in accessing a function at a cloud may increase in proportion to the signal path complexities. For example, the further the physical geographic location of a server from a UE, the greater the duration experienced by the UE in accessing a function available at that server.

Edge computing may reduce signal path complexities by providing various functions at servers that are relatively closer in proximity to UEs accessing such functions. Accordingly, edge computing may reduce the latency experienced by UEs relative to cloud computing. In order for a RAN to provide a UE with access an edge server, a cell of the RAN on which the UE operates should be connected with the edge server. However, some cells of the RAN may not be connected with an edge server that provides a function requested by a UE. FIGS. 4-10 describe various approaches and solutions for configuring UE access and mobility to a cell through which the UE can access a specific edge application.

Figure 4:
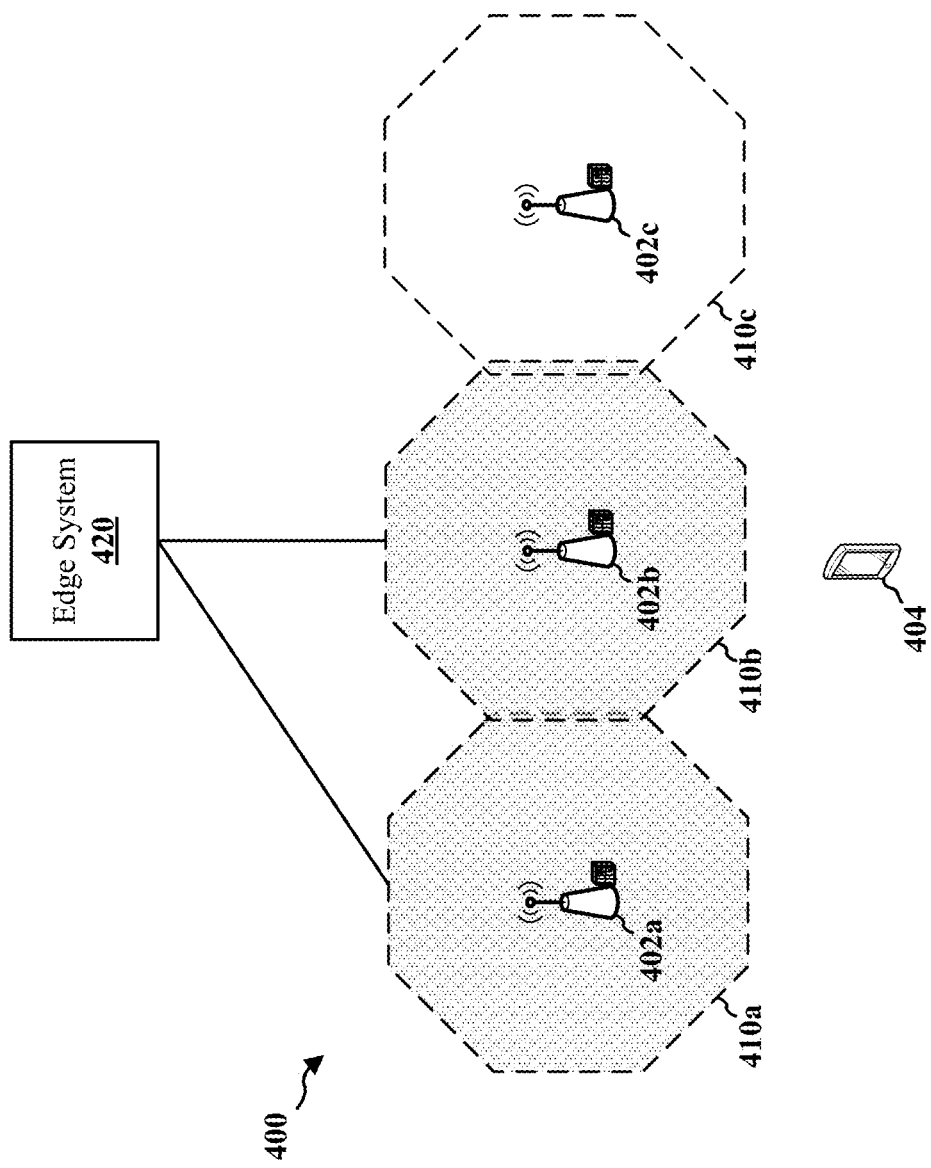
FIG. 4 is a diagram illustrating an example of an edge computing system available through an access network.

FIG. 4 is a diagram illustrating an example of an access network 400 partially connected with an edge computing system 420. Thus, the edge computing system 420 may be partially available through the access network 400. The edge system 420 may include an Edge Application Server. The edge system 420 may be part of an Edge Data Network, which may further include an Edge Enabler Server. Correspondingly, the UE 404 may be configured with a client through which the UE 404 may establish a connection with the Edge Application Server, such as an Edge Enabler Client. At the UE 404, the client may enable discovery of an edge application that is of interest to the UE 404 and, further, may provision configuration data for the edge application.

The UE 404 may access the edge system 420 through a cellular network, including first through the access network 400. The access network 400 may include a set of base stations 402a-c, such as gNBs, configured to provide a respective one of the cells 410a-c. Correspondingly, the UE 404 may operate on a respective one of the cells 410a-c when attempting to access an edge application at the edge system 420. However, while the edge system 420 may be accessible through some cells of the access network 400, other cells of the access network 400 may lack a connection to the edge system 420.

In the illustrated aspect, the first and second base stations 402a-b may provide first and second cells 410a-b, respectively, through which the edge system 420 is accessible. Conversely, the third base station 402c may provide a cell 410c through which the edge system 420 is inaccessible. Thus, the UE 404 may benefit from approaches and solutions to UE mobility that prioritize the first and second cells 410a-b so that the UE 404 operates on one of the first and second cells 410a-b when the UE 404 utilizes an edge application provided by the edge system 420.

Figure 5:
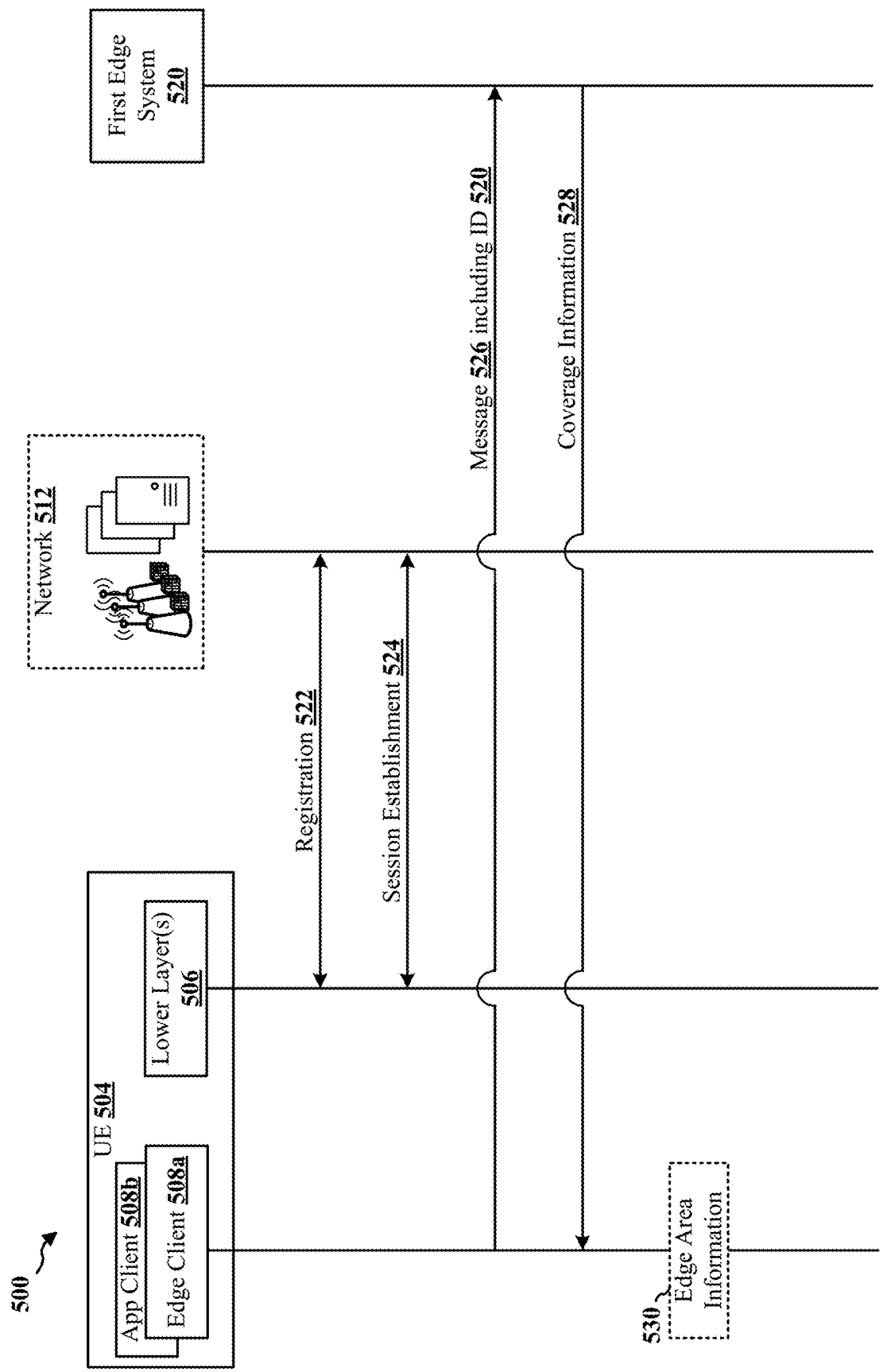
FIG. 5 is a call flow diagram illustrating an example data flow in a wireless communications system and an access network.

FIG. 5 is a call flow diagram illustrating an example data flow 500 in a wireless communications system in which a cellular network 512 is connected with a first edge system 520. The cellular network 512 may include an access network and an EPC and/or core network (e.g., as described, supra, by the EPC 160 and the core network 190, respectively, of FIG. 1). Through the core network and/or EPC, the access network may connect with a first edge system 520. The first edge system 520 may include at least an Edge Data Network Configuration Server that provides configuration information associated with an Edge Data Network, such as configuration information associated with an Edge Enabler Server and/or an Edge Application Server.

To implement an edge application, the UE 504 may be configured with an edge client 508a and/or an application (app) client 508b. In some aspects, the edge client 508a may include an Edge Enabler Client, which may provide an interface with the first edge system 520. The app client 508b may provide an interface with a specific application delivered through a function of an Edge Application Server. In some aspects, the UE 504 may be configured with multiple app clients, each of which may provide an interface with a different application delivered through a respective function of one or more Edge Application Servers.

According to various aspects, the edge application of the app client 508b may include an application, service, and/or content that an Edge Application Server is configured to provide (e.g., via a function at the Edge Application Server), such as data storage, processing power, and/or other computing resources. For example, the Edge Application Server configured to provide the edge application may include one or more data centers and/or servers (e.g., server farms) with appreciably superior memory and storage availability and/or processing power and capability than the UE 504 while simultaneously being limited by fewer local constraints than the UE 504, especially with respect to power management. By way of illustration, the edge application may include storage, real-time data processing, data visualization and analytics, caching and buffering, multimedia (e.g., audio, photo, video, etc.) processing and orchestration, sensor monitoring, and numerous other applications. The edge application may be utilized in a number of different contexts, such as end user applications, IoT communication, machineto-machine (M2M) communication, vehicle-to-everything (V2X) communication, and so forth.

The clients 508a-b may reside at a relatively higher layer of a protocol stack with which the UE 504 is configured. In particular, the clients 508a-b may be configured at a layer implemented on top of a radio protocol stack, such as an application layer. The radio protocol stack of the UE 504 may include one or more layers configured as lower layers 506, e.g., relative to the clients 508a-b. The lower layers 506 may include one or more of a PDCP layer, RLC layer, MAC layer, and/or PHY layer. The UE 504 may include various physical components that implement the lower layers 506, such as a modem, baseband processor, radio frequency (RF) frontend, and/or one or more other components, which may be implemented on an SoC, integrated circuit, and/or other similar chip and/or processor.

The lower layers 506 may be configured for wireless communication in the cellular network 512, which may include a 3GPP network (e.g., including a 5G NR RAN). The cellular network 512 may connect the UE 504 with various other networks, such as the Internet and the Edge Data Network. In order to communicate with such various other networks through the cellular network 512, the lower layers 506 may initially perform network registration 522 with the cellular network 512.

Network registration 522 may include, for example, a random access channel (RACH) procedure in the access network in order to obtain uplink timing synchronization and/or uplink grants with a gNB or other base station of the cellular network 512). For example, the lower layers 506 may transmit a RACH preamble message to the cellular network 512 (e.g., to a gNB or other base station) and, responsive to the RACH preamble message, the lower layers 506 may receive a RACH response message.

In addition, the lower layers 506 may transmit a registration request to the cellular network 512. Based on the registration request, the UE 504 may be registered in the cellular network 512 (e.g., by the AMF 192). For example, the UE 504 may be identified in the cellular network 512 and may be provided information used to identify the UE 504 in the cellular network 512 during network registration 522.

Further, the lower layers 506 may establish perform session establishment 524. Illustratively, session establishment 524 may include establishment of a PDU session, which may provide association between the UE 504 and an IP data network thereby allowing the UE 504 to access IP services, such as the first edge system 520. In some aspects, the lower layers 506 may transmit a PDU session establishment request to the cellular network 512, for example, via NAS signaling.

The cellular network 512 may receive the PDU session establishment request, for example, at an SMF (e.g., the SMF 194 of FIG. 1). Responsive to the PDU session establishment request, a context may be established or updated for the UE 504. Subsequently, the cellular network 512 (e.g., the UPF 195 of FIG. 1) may configure IP and/or port information (e.g., an IP address and/or port number(s), respectively) for the UE 504. Subsequently, the cellular network 512 may transmit a PDU session establishment accept to the UE 504, which may include a PDU session ID.

The lower layers 506 may receive the PDU session establishment accept during session establishment 524 and, potentially, other information associated with the PDU session for the UE 504. According to the established PDU session, the lower layers 506 may be configured to communicate with IP services (e.g., IP services 197 of FIG. 1) via the context configured by the cellular network 512. In particular, the established PDU session may allow the UE 504 to communicate with the first edge system 520.

The edge client 508a may be configured to communicate with the first edge system 520 through the cellular network 512 in order to obtain information associated with the edge application of the app client 508b. The app client 508b may be associated with an ID 520 that uniquely identifies the edge application of the app client 508b in the first edge system 520. For example, the ID 520 may be an Edge Application ID, an Edge Service ID, or other information that uniquely identifies the edge application of the app client 508b at the Edge Data Network Configuration Server, as well as at the Edge Enabler Server and/or Edge Application Server.

As the Edge Application Server configured to provide the edge application of the app client 508b may be inaccessible through some cells of the cellular network 512, the edge client 508a may be configured to determine edge area information 530 that includes information indicating a set of geographic areas and/or cells through which the app client 508b may access the Edge Application Server configured to provide the edge application of the app client 508b. The app client 508b may provide the ID 520 to the edge client 508a, and the edge client 508a may provide a message 526 that includes information indicating the ID 520 to the lower layers 506.

The lower layers 506 may transmit the message 526 to the first edge system 520, e.g., through the established PDU session. In some aspects, the message 526 may be a hypertext transfer protocol (HTTP) message, and may be a secure extension of HTTP—that is, HTTP Secure (HTTPS). In some further aspects, the message 526 may be a GET method request and/or area request.

The first edge system 520 may receive the ID 520. Based on the ID 520, the first edge system 520 may determine coverage information 528 that indicates a set of geographic areas and/or cells through which the app client 508b may access the Edge Application Server configured to provide the edge application of the app client 508b. According to some aspects, the coverage information 528 may include a set of cell global identities (CGIs), and each CGI may uniquely identify a cell that is able to provide the app client 508b with access to the Edge Application Server configured to provide the edge application corresponding to the ID 520. According to some other aspects, the coverage information 528 may include a set of tracking area identities (TAIs), and each TAI may uniquely identify a set of cells (e.g., grouped together at the cellular network 512) that each is able to provide the app client 508b with access to the Edge Application Server configured to provide the edge application corresponding to the ID 520.

The first edge system 520 may transmit the coverage information 528 to the UE 504. In some aspects, the coverage information 528 may be included in an HTTP or HTTPS message. In some further aspects, the coverage information 528 may be included in a response message to the GET method request indicated by the message 526 and/or an area response to the area request of the message 526.

Correspondingly, the lower layers 506 may receive the coverage information 528, e.g., through the established PDU session. The lower layers 506 may provide the coverage information 528 to the edge client 508a. Based on the received coverage information 528, the edge client 508a may determine the edge area information 530 to include the set of geographic areas and/or cells that are able to provide access to the Edge Application Server configured to provide the edge application of the app client 508b. For example, the edge client 508a may generate or update the edge area information 530 to include the set of CGIs and/or set of TAIs indicated by the coverage information 528, and the edge client 508a may store the edge area information 530 in memory or storage (e.g., local memory or storage) of the UE 504.

Figure 6:
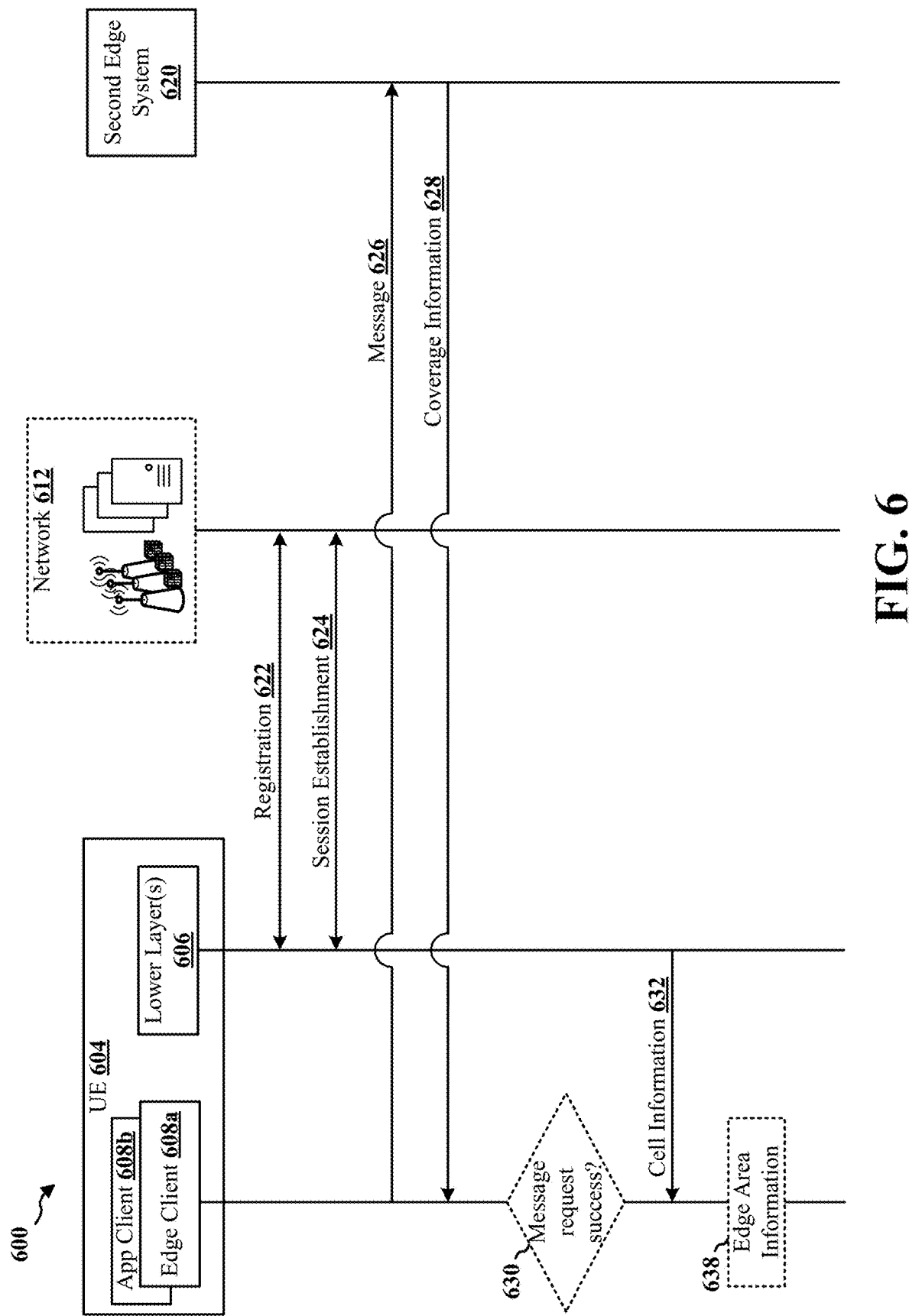
FIG. 6 is a call flow diagram illustrating another example data flow in a wireless communications system and an access network.

FIG. 6 is a call flow diagram illustrating another example data flow 600 in a wireless communications system in which a cellular network 612 is connected with a second edge system 620. The cellular network 612 may include an access network and an EPC and/or core network (e.g., as described, supra, by the EPC 160 and the core network 190, respectively, of FIG. 1). Through the core network and/or EPC, the access network may connect with the second edge system 620.

In the illustrated aspect of FIG. 6, the second edge system 620 may include at least a portion of an Edge Data Network, such as an Edge Enabler Server and/or an Edge Application Server. According to various aspects, the second edge system 620 may be any system (e.g., server, server farm, data center, etc.) configured to provide the edge application of the app client 608b.

According to FIG. 6, the edge client 608a may determine edge area information 638 without assistance from an Edge Data Network Configuration Server. Instead, the edge client 608a may populate the edge area information 638 by attempting to establish a connection with the second edge system 620 (e.g., Edge Enabler Server and/or Edge Application Server) configured to provide the edge application of the app client 608b—for example, the edge client 608a may populate the edge area information 638 through a "trial-and-error" approach to connecting with the Edge Application Server.

Initially, the lower layers 606 may perform network registration 622 and session establishment 624 (e.g., PDU session establishment), e.g., as described, supra, by registration 522 and session establishment 524, respectively, illustrated in FIG. 5. Accordingly, the UE 504 may operate on a first cell of the cellular network 612, which may provide IP services to the UE 604.

Subsequently, the edge client 608a may cause the lower layers 606 to transmit a message 626 addressed to the edge system 620. In some aspects, the message 626 may include a request for the edge application by the app client 608b. For example, the message 626 may include an application request or a service request associated with the edge application of the app client 608b. In some further aspects, the message 626 may include information indicating an ID of the edge application of the app client 608b (e.g., as described, supra, by the ID 520 illustrated in FIG. 5).

According to one aspect, the cellular network 612 may not provide access to any second edge system 620 configured to provide the edge application of the app client 608b, e.g., through at least the first cell of the cellular network 612 on which the UE 604 is operating. For example, referring to FIG. 4, the edge system 420 may be inaccessible by the 404 when the UE 404 is operating on the third cell 410c provided by the third base station 402c. Consequently, the cellular network 612 may respond to the message 626 with coverage information 628 indicating that the second edge system 620 is inaccessible. For example, the cellular network 612 may transmit coverage information 628 indicating the edge application of the app client 608b is unavailable as an edge computing service, e.g., through at least the first cell of the cellular network 612 on which the UE 604 is operating. In another example, the cellular network 612 may transmit coverage information 628 indicating an error or other information informing the UE 604 that the request of the message 626 for the edge application of the app client 608b cannot be fulfilled.

The lower layers 606 may receive, from the cellular network 612 in response to the message 626, the coverage information 628 (e.g., response message) indicating that the edge application of the app client 608b is inaccessible at any second edge system 620. The lower layers 606 may provide the coverage information 628 to the edge client 608a. Based on the coverage information 628, the edge client 608a may determine 630 that the first cell of the cellular network 612 does not provide access to any second edge system 620 configured to provide the edge application of the app client 608b. Accordingly, the edge client 608a may obtain cell information 632 associated with the first cell from the lower layers 606. The cell information 632 may include a CGI and/or TAI associated with the first cell of the cellular network 612.

The edge client 608a may then indicate, in the edge area information 638, that the first cell of the cellular network 612 does not provide access to any second edge system 620 configured to provide the edge application of the app client 608b based on the cell information 632. For example, the edge client 608a may generate or update the edge area information 638 to exclude the first cell from a set of cells indicated as providing access to the edge application of the app client 608b at a second edge system 620 and/or the edge client 608a may generate or update the edge area information 638 to include the first cell in another set of cells indicated as not providing access to the edge application of the app client 608b at a second edge system 620.

According to another aspect, the cellular network 612 may provide access to a second edge system 620 configured to provide the edge application of the app client 608b, e.g., through at least the first cell of the cellular network 612 on which the UE 604 is operating. For example, referring to FIG. 4, the edge system 420 may be accessible by the 404 when the UE 404 is operating on the first or second cells 410a-b provided by the first and second base stations 402a-b, respectively. Accordingly, the cellular network 612 may respond to the message 626 with coverage information 628 indicating that the second edge system 620 is able to provide the edge application of the app client 608b. For example, the cellular network 612 may transmit coverage information 628 indicating the request of the message 626 for edge application of the app client 608b is being fulfilled by the second edge system 620 and/or indicating that the edge application of the app client 608b is being executed at the second edge system 620 in response to the request of the message 626.

The lower layers 606 may receive, from the cellular network 612 in response to the message 626, the coverage information 628 (e.g., response message) indicating that the edge application of the app client 608b is accessible at the second edge system 620, which may include, for example, information indicating that the edge application of the app client 608b is being executed at the second edge system 620. The lower layers 606 may provide the coverage information 628 to the edge client 608a. Based on the coverage information 628, the edge client 608a may determine 630 that the first cell of the cellular network 612 does provide access to a second edge system 620 configured to provide the edge application of the app client 608b. Further, the edge client 608a may obtain cell information 632 associated with the first cell from the lower layers 606. The cell information 632 may include a CGI and/or TAI associated with the first cell of the cellular network 612.

The edge client 608*a* may then indicate, in the edge area information 638, that the first cell of the cellular network 612 does provide access to a second edge system 620 configured to provide the edge application of the app client 608*b* based on the cell information 632. For example, the edge client 608*a* may generate or update the edge area information 638 to include the first cell in a set of cells indicated as providing access to the edge application of the app client 608*b* at the second edge system 620.

Figure 7:
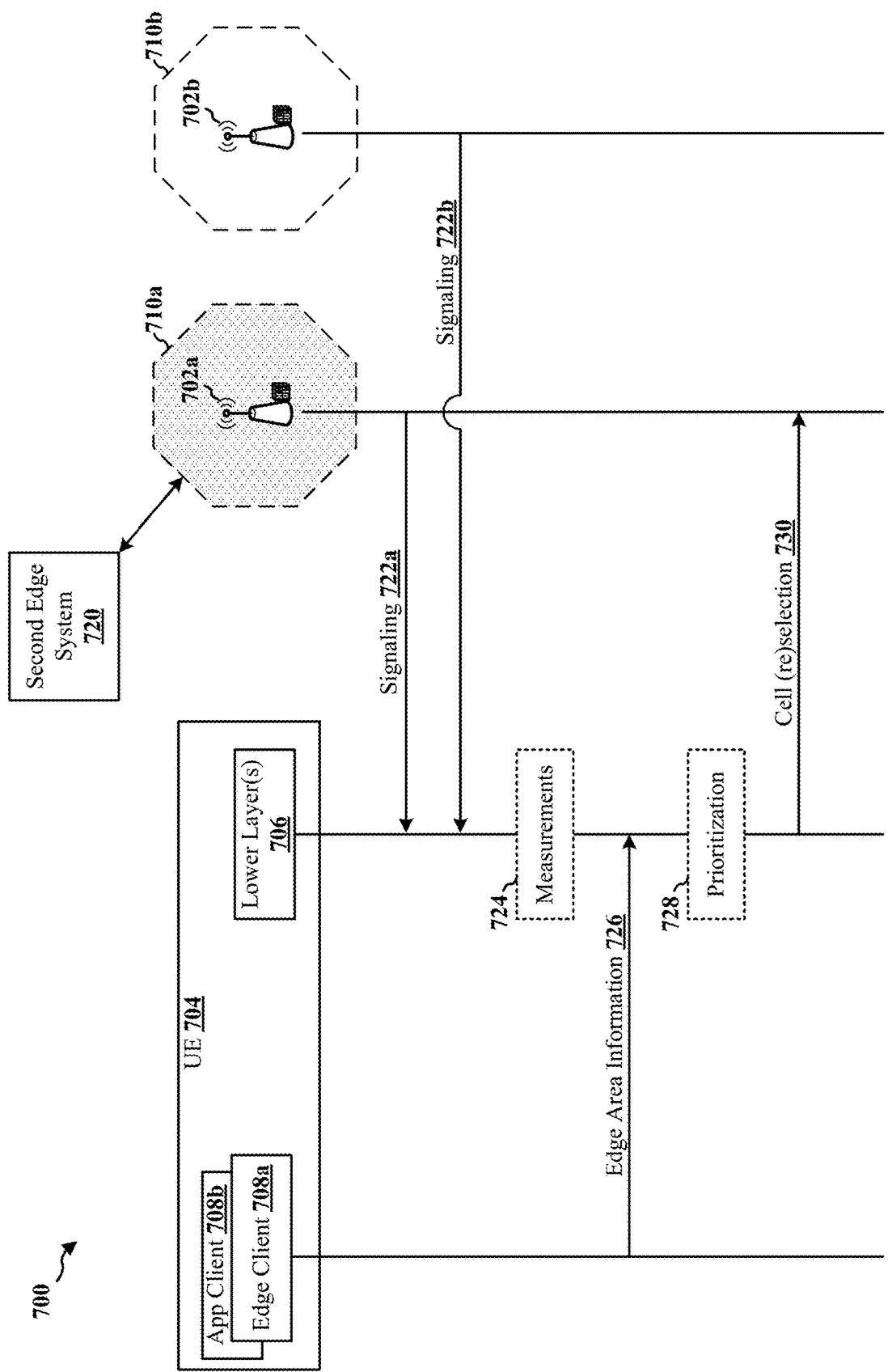
FIG. 7 is a call flow diagram illustrating an example data flow in an access network connected with an edge computing system.

FIG. 7 is a call flow diagram illustrating an example data flow 700 in an access network connected with an edge computing system. In the illustrated aspect of FIG. 7, the UE 704 may be performing initial access or cell reselection. For example, the UE 704 may be operating in an RRC Idle mode or an RRC Inactive mode. The UE 704 may be configured with an app client 708*b* having an edge application configured to be provided by a second edge system 720. The second edge system 720 may include an Edge Enabler Server and/or Edge Application Server. For example, the second edge system 720 may include any Edge Application Server configured to provide the edge application of the app client 708*b*.

The edge client 708*a* may be configured with edge area information 726, which may include a set of cells that provide access to a second edge system 720 configured to deliver the edge application of the app client 708*b*. For example, the edge area information 726 may include a set of CGIs and/or TAIs, each of which may be associated with a respective cell providing access to the edge application of the app client 708*b* at a second edge system 720. Accordingly, the UE 704 may be configured to prioritize a cell included in the set of cells of the edge area information 726 over another cell that is not included in that set of cells, which may be a cell that does not provide access to a second edge system 720 configured to deliver the edge application of the app client 708*b*.

The lower layers 706 of the UE 704 may receive signaling 722*a-b* from the first and second cells 710*a-b*, respectively. Each of the signaling 722*a-b* may include a set of synchronization signals (e.g., a set of SS/PBCH blocks) and/or a set of reference signals. The lower layers 706 of the UE 704 may perform measurements 724 on each of the signaling 722*a-b*. For example, the lower layers 706 may measure at least one of a reference signal receive power (RSRP), a reference signal receive quality (RSRQ), a signal-to-noise ratio (SNR), a reference signal strength indicator (RSSI), or any other value indicative of the channel quality on which one of the signaling 722*a-b* is received.

The lower layers 706 may store information indicating the measurements 724, and the information indicating the measurements 724 may be used for cell selection/reselection 730. In advance of selecting/reselecting a cell, however, the edge client 708*a* may provide edge area information 726 indicating a set of cells that should be prioritized during cell selection/reselection. The lower layers 706 may obtain the edge area information 726 and may determine whether any of the cells 710*a-b* correspond to the set of cells indicated in the edge area information 726.

In one aspect, the lower layers 706 may determine whether any of the cells 710*a-b* is associated with a CGI that matches a CGI included in the set of cells of the edge area information 726. For example, the lower layers 706 may compare each of the CGIs associated with the cells 710*a-b* from which a respective one of the signaling 722*a-b* is received to each of the CGIs indicated in the set of cells in the edge area information 726. In another aspect, the lower layers 706 may determine whether any of the cells 710*a-b* is located within a tracking area associated with a TAI that corresponds to a TAI included in the edge area information 726. For example, the lower layers 706 may compare each of the TAIs associated with the cells 710*a-b* from which the signaling 722*a-b* is received (e.g., the cells 710*a-b* may be associated with the same TAI) to each of the TAIs indicated in the edge area information 726.

If the edge area information 726 indicates that one or more of the cells 710*a-b* provides access to a second edge system 720 configured to deliver the edge application of the app client 708*b*, then the lower layers 706 may perform prioritization 728 of the one or more cells indicated in the edge information 726 over any other cells that are absent from the edge information 726 (e.g., cells that do not provide access to a second edge system 720 configured to deliver the edge application of the app client 708*b*).

If all of the cells 710*a-b* that are candidates for cell selection/reselection by the UE 704 are either included in the edge area information 726 or excluded from the edge area information 726, then the lower layers 706 may refrain from prioritization 728—for example, the lower layers 706 may perform cell selection/reselection 730 based on the measurements 724 and/or other cell selection/reselection factors that are not contingent upon access to the edge application of the app client 708*b*.

However, if the edge area information 726 indicates that a first one of the cells 710*a-b* does provide access to a second edge system 720 configured to deliver the edge application of the app client 708*b* but a second one of the cells 710*a-b* does not, then the lower layers 706 may perform prioritization 728 of the first cell 710*a* over the second cell 710*b*. By performing prioritization 728 of the first cell 710*a* over the second cell 710*b*, the lower layers 706 may increase the likelihood the first cell 710*a* will be selected/reselected relative to the second cell 710*b*. That is, prioritization 728 may increase the quality (e.g., signal strength) of the first cell 710*a* as a candidate cell for cell selection/reselection over that of the second cell 710*b*.

In one aspect, the lower layers 706 may perform prioritization 728 of the first cell 710*a* over the second cell 710*b* by weighting one or more of the measurements 724 upon which cell selection/reselection is based. For example, the lower layers 706 may increase a first one of the measurements 724 associated with the first cell 710*a*, such as by adding a first offset to the first one of the measurements 724. In another example, the lower layers 706 may decrease a second one of the measurements 724 associated with the second cell 710*b*, such as by subtracting a second offset from the second one of the measurements 724. Thus, the prioritized first cell 710*a* may appear as a better candidate for cell selection/reselection than the second cell 710*b* in the measurements 724 upon which the cell selection/reselection 730 may be based.

Based on the prioritization 728, the lower layers 706 may determine to perform cell selection/reselection 730 on the first cell 710*a* instead of the second cell 710*b*. For example, the lower layers 706 may determine to perform cell selection/reselection 730 on the first cell 710*a* even if the measurements 724 (e.g., the measurements 724 before prioritization 728) indicate that the second cell 710*b* would have otherwise been a better candidate for cell selection/reselection (e.g., even if the RSRP, RSRQ, SNR, and/or RSSI measured from the second signaling 722*b* from the second cell 710b is higher or better than the RSRP, RSRQ, SNR, and/or RSSI measured from the first signaling 722a from the first cell 710a).

Accordingly, the UE 704 may select/reselect the first cell 710a, and may connect with the first base station 702a that operates the first cell 710a. For example, the UE 704 (e.g., lower layers 706) may perform a contention-based RACH procedure with the first base station 702a. Consequently, the UE 704 may refrain from connecting with the second base station 702b that operates the second cell 710b.

Figure 8:
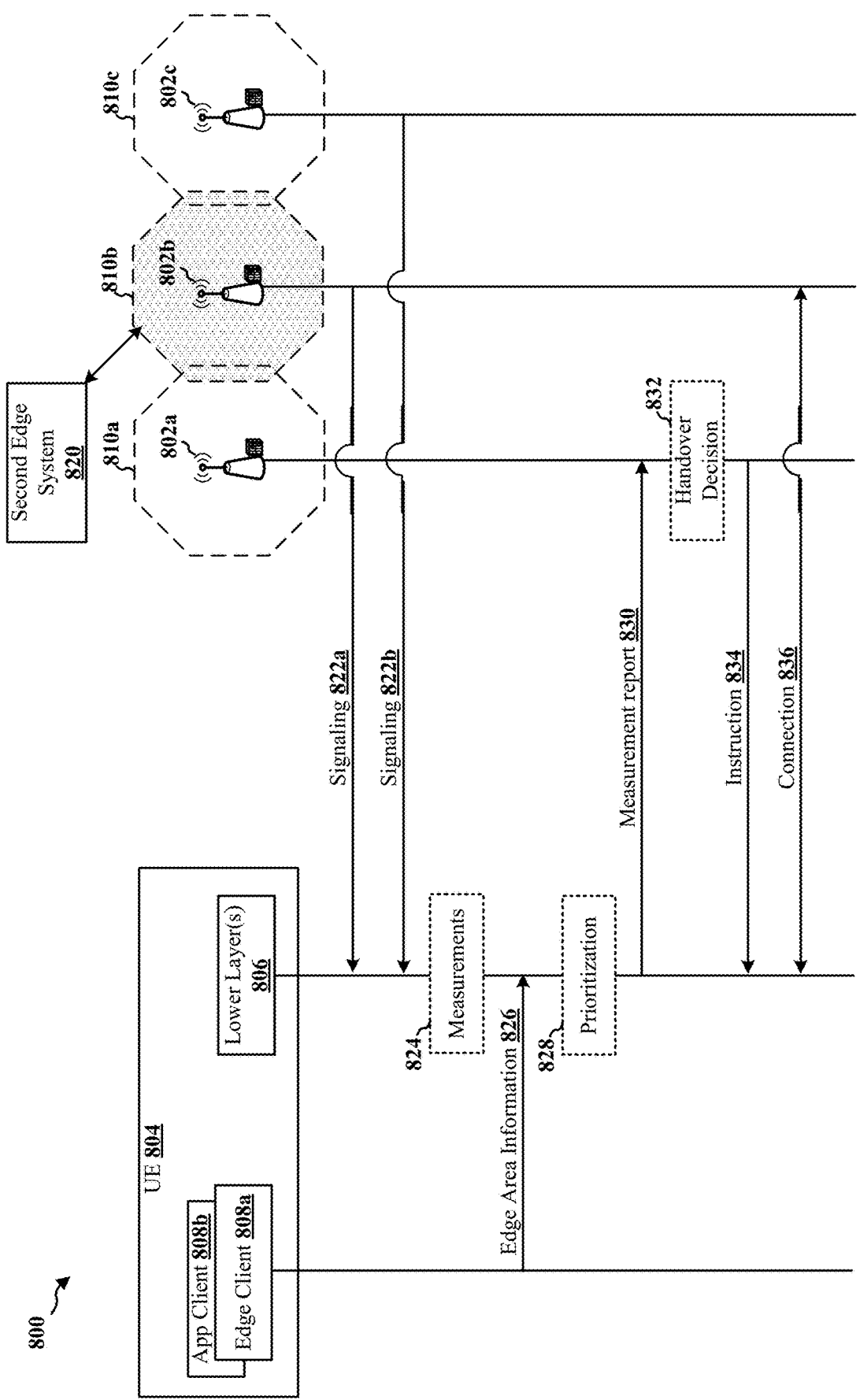
FIG. 8 is a call flow diagram illustrating another example data flow in an access network connected with an edge computing system.

FIG. 8 is a call flow diagram illustrating another example data flow 800 in an access network connected with an edge computing system. In the illustrated aspect of FIG. 8, the UE 804 may be operating on a source cell 810a provided by a source base station 802a and, therefore, the UE 804 may be connected with the source base station 802a. For example, the UE 804 may be operating in an RRC Connected mode. The UE 804 may be configured with an app client 808b having an edge application configured to be provided by a second edge system 820. The second edge system 820 may include an Edge Enabler Server and/or Edge Application Server. For example, the second edge system 820 may include any Edge Application Server configured to provide the edge application of the app client 808b.

The edge client 808a may be configured with edge area information 826, which may include a set of cells that provide access to a second edge system 820 configured to deliver the edge application of the app client 808b. For example, the edge area information 826 may include a set of CGIs and/or TAIs, each of which may be associated with a respective cell providing access to the edge application of the app client 808b at a second edge system 820. Accordingly, the UE 804 may be configured to prioritize a cell included in the set of cells of the edge area information 826 over another cell that is not included in that set of cells, which may be a cell that does not provide access to a second edge system 820 configured to deliver the edge application of the app client 808b.

As the UE 804 is operating on the source cell 810a provided by the source base station 802a, the source base station 802a may configure the UE mobility in the access network. In particular, the source base station 802a may control handover of the UE 804 to neighboring cells 810b-c. Therefore, the UE 804 may perform prioritization 828 by affecting the configuration of UE mobility by the source base station 802a.

While operating on the source cell 810a, the lower layers 806 of the UE 804 may receive signaling 822a-b from neighboring second and third cells 810b-c, respectively, e.g., in association with UE mobility. Each of the signaling 822a-b may include a set of synchronization signals (e.g., a set of SS/PBCH blocks) and/or a set of reference signals. The lower layers 806 of the UE 804 may perform measurements 824 on each of the signaling 822a-b. For example, the lower layers 806 may measure at least one of an RSRP, an RSRQ, an SNR, an RSSI, or any other value indicative of the channel quality on which one of the signaling 822a-b is received.

The lower layers 806 may store information indicating the measurements 824, and the information indicating the measurements 824 may be used for measurement reporting and/or UE mobility, such as handover. In advance of measurement reporting, however, the edge client 808a may provide edge area information 826 indicating a set of cells that should be prioritized during measurement reporting and/or UE mobility operations. The lower layers 806 may obtain the edge area information 826 and may determine whether any of the neighboring cells 810b-c correspond to the set of cells indicated in the edge area information 826.

In one aspect, the lower layers 806 may determine whether any of the neighboring cells 810b-c is associated with a CGI that matches a CGI included in the set of cells of the edge area information 826. For example, the lower layers 806 may compare each of the CGIs associated with the neighboring cells 810b-c from which a respective one of the signaling 822a-b is received to each of the CGIs indicated in the set of cells in the edge area information 826. In another aspect, the lower layers 806 may determine whether any of the neighboring cells 810b-c is located within a tracking area associated with a TAI that corresponds to a TAI included in the edge area information 826. For example, the lower layers 806 may compare each of the TAIs associated with the neighboring cells 810b-c from which a respective one of the signaling 822a-b is received (e.g., the neighboring cells 810b-c may be associated with the same TAI) to each of the TAIs indicated in the edge area information 826.

If the edge area information 826 indicates that one or more of the neighboring cells 810b-c provides access to a second edge system 820 configured to deliver the edge application of the app client 808b, then the lower layers 806 may perform prioritization 828 of the one or more cells indicated in the edge information 826 over any other cells that are absent from the edge information 826 (e.g., cells that do not provide access to a second edge system 820 configured to deliver the edge application of the app client 808b).

If all of the neighboring cells 810b-c that are candidates for measurement reporting and/or handover are either included in the edge area information 826 or excluded from the edge area information 826, then the lower layers 806 may refrain from prioritization 828—for example, the lower layers 806 may perform measurement reporting based on the measurements 824 and/or other UE mobility factors that are not contingent upon access to the edge application of the app client 808b.

However, if the edge area information 826 indicates that a first one of the neighboring cells 810b-c does provide access to a second edge system 820 configured to deliver the edge application of the app client 808b but a second one of the neighboring cells 810b-c does not, then the lower layers 806 may perform prioritization 828 of the first neighboring cell 810b over the second neighboring cell 810c. By performing prioritization 828 of the first neighboring cell 810b over the second neighboring cell 810c, the lower layers 806 may increase the likelihood that the source base station 802a selects the first neighboring cell 810b as the target cell for handover rather than the second neighboring cell 810c. That is, prioritization 828 may increase the reported quality (e.g., signal strength) of the first neighboring cell 810b as the target for handover over that of the second neighboring cell 810c.

In one aspect, the lower layers 806 may perform prioritization 828 of the first neighboring cell 810b over the second neighboring cell 810c by weighting one or more of the measurements 824 that the source base station 802a uses for a handover decision. For example, the lower layers 806 may increase a first one of the measurements 824 associated with the first neighboring cell 810b, such as by adding a first offset to the first one of the measurements 824. In another example, the lower layers 806 may decrease a second one of the measurements 824 associated with the second neighboring cell 810c, such as by subtracting a second offset from the second one of the measurements 824. Thus, the prioritized first neighboring cell 810b may appear to the source base station 802a as a better candidate in the handover decision than the second neighboring cell 810c in the measurements 824 upon which the source base station 802a bases the handover decision.

Subsequently, the lower layers 806 may perform measurement reporting for the handover decision by the source base station 802a by transmitting a measurement report 830 to the source base station 802a. The lower layers 806 may include the prioritized measurements 824 in the measurement report 830. For example, the lower layers 806 may include the increased first one of the measurements 824 associated with the first neighboring cell 810b and/or the decreased second one of the measurements 824 associated with the second neighboring cell 810c in the measurement report 830, which is then transmitted by the lower layers 806 to the source base station 802a.

The source base station 802a may receive the measurement report 830 and, based on the prioritization 828 reflected in the measurement report 830, the source base station 802a may perform a handover decision 832 in which the source base station 802a selects the first neighboring cell 810b instead of the second neighboring cell 810c as the target for handover of the UE 804. For example, the source base station 802a may select the first neighboring cell 810b as the target in the handover decision 832 even if the non-prioritized measurements 824 (e.g., the measurements 824 before prioritization 828) indicate that the second neighboring cell 810c would have otherwise been a better target cell in the handover decision 832 (e.g., even if the RSRP, RSRQ, SNR, and/or RSSI measured from the second signaling 822b from the second neighboring cell 810c is higher or better than the RSRP, RSRQ, SNR, and/or RSSI measured from the first signaling 822a from the first neighboring cell 810b).

Based on the handover decision 832 in which the source base station 802a selects the first neighboring cell 810b as the handover target, the source base station 802a may generate an instruction 834 passing the UE 804 to the first neighboring cell 810b. The instruction 834 may be a handover command indicating the first neighboring cell 810b as the handover target. Subsequently, the source base station 802a may transmit the instruction 834 to the UE 804.

Correspondingly, the lower layers 806 of the UE 804 may receive the instruction 834. The lower layers 806 may then establish a connection 836 with the first neighboring base station 802b based on the instruction 834. For example, the UE 804 (e.g., lower layers 806) may perform a contention-free RACH procedure with the first neighboring base station 802b. Consequently, the UE 804 may refrain from connecting with the second neighboring base station 802c that operates the second neighboring cell 810c.

Figure 9:
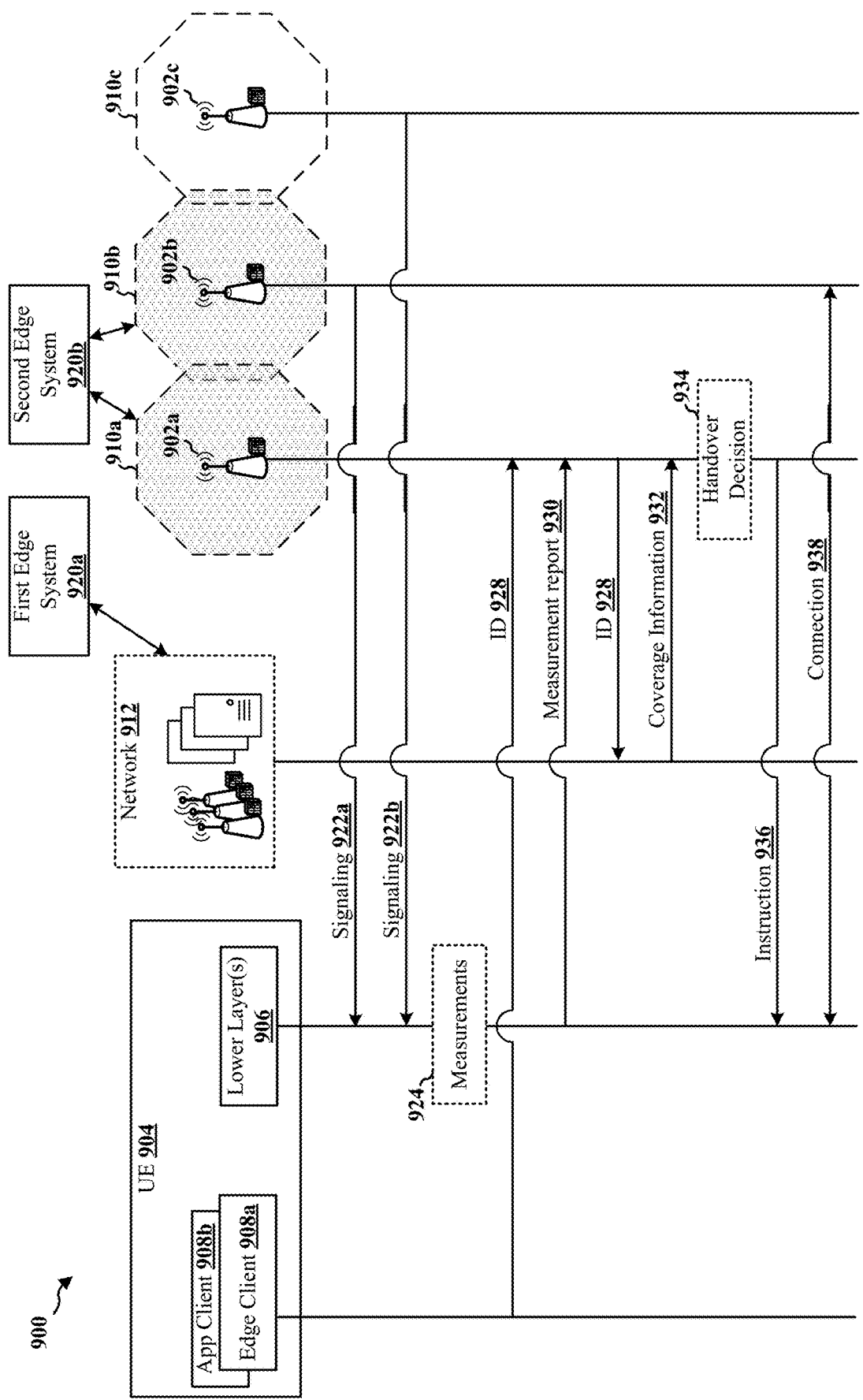
FIG. 9 is a call flow diagram illustrating a further example data flow in an access network connected with an edge computing system.

FIG. 9 is a call flow diagram illustrating an example data flow 900 in a cellular network connected with edge computing systems. In the illustrated aspect of FIG. 9, a cellular network 912 may include an access network and an EPC and/or core network (e.g., as described, supra, by the EPC 160 and the core network 190, respectively, of FIG. 1). Through the core network and/or EPC, the access network may connect with a first edge system 920a and a second edge system 920b.

The first edge system 920a may provide configuration information associated with the second edge system 920b. For example, the first edge system 920a may include at least an Edge Data Network Configuration Server that provides configuration information associated with the second edge system 920b, which may include an Edge Data Network having an Edge Enabler Server and/or an Edge Application Server.

The cellular network 912 may provide a gateway (e.g., via IP services) to the second edge system 920b for the UE 904. The UE 904 may be configured with an app client 908b having an edge application configured to be provided by the second edge system 920b. According to various aspects, the second edge system 620 may be any system (e.g., server, server farm, data center, etc.) configured to provide the edge application of the app client 608b.

To reach the gateway functionality the cellular network 912 toward the second edge system 920b, the UE 904 may connect through the access network of the cellular network 912, which may be formed by a set of base station 902a-c providing a respective one of the cells 910a-c. However, a second edge system 920b configured to provide an edge application of the app client 908b may not be accessible through every one of the cells 910a-c, e.g., due to varying locations and/or connections paths of the base stations 902a-c. In the illustrated aspect of FIG. 9, for example, two cells 910a-b may provide access to the second edge system 920b, whereas another cell 910c may not provide access to any second edge system 920b configured to provide the edge application of the app client 908b.

The UE 904 may be operating on the source cell 910a provided by the source base station 902a and, therefore, the UE 904 may be connected with the source base station 902a. For example, the UE 904 may be operating in an RRC Connected mode. The neighboring base stations 902b-c may be located relatively proximate to the source base station 902a, and therefore, may operate a respective one of the neighboring cells 910b-c. Due to their relative proximity to the source base station 902a, both of the neighboring cells 910b-c may be potential targets for handover of the UE 904 when the source base station 902a performs a handover decision for UE mobility.

In some instances, the handover decision for the UE 904 may be based primarily on which of the neighboring cells 910b-c provides better channel conditions for UE communication. However, the UE 904 may prefer to handover to one of the neighboring cells 910b-c that provides access to the second edge system 920b, e.g., so that the app client 908b is able to access the edge application delivered by the second edge system 920b. In some aspects, the cellular network 912 may implement prioritization of UE-preferred cells providing access to a second edge system 920b over cells not providing access to a second edge system 920b during handover of the UE 904.

As the UE 904 is operating on the source cell 910a provided by the source base station 902a, the source base station 902a may configure the UE mobility in the access network. In particular, the first base station 902a may control handover of the UE 904 to neighboring cells 910b-c. Therefore, for UE mobility, the source base station 902a may implement prioritization of cells that provide access to a second edge system 920b over cells that do not in handover decisions performed by the source base station 902a.

While operating on the first cell 910a, the lower layers 906 of the UE 904 may receive signaling 922a-b from neighboring cells 910b-c, respectively, e.g., in association with UE mobility. Each of the signaling 922a-b may include a set of synchronization signals (e.g., a set of SS/PBCH blocks) and/or a set of reference signals. The lower layers 906 of the UE 904 may perform measurements 924 on each of the signaling 922a-b. For example, the lower layers 906 may measure at least one of an RSRP, an RSRQ, an SNR, an RSSI, or any other value indicative of the channel quality on which one of the signaling 922a-b is received.

The lower layers 906 may store information indicating the measurements 924, and the information indicating the measurements 924 may be used for measurement reporting and/or UE mobility, such as handover. In advance of measurement reporting, however, the edge client 908a may transmit information indicating an ID 928 associated with the edge application of the app client 908b to the source base station 902a.

The source base station 902a may be configured to determine whether any of the neighboring cells 910b-c provides access to a second edge system 920b configured to deliver the edge application of the app client 908b. In some aspects, the source base station 902a may transmit information indicating the ID 928 associated with the edge application of the app client 908b to the first edge system 920a, e.g., through the core network and/or EPC of the cellular network 912.

The first edge system 920a may receive the ID 928. Based on the ID 928, the first edge system 928 may determine coverage information 932 that indicates a set of geographic areas and/or cells through which the app client 908b may access the second edge system 920b configured to provide the edge application of the app client 908b. According to some aspects, the coverage information 932 may include a set of CGIs, and each CGI may uniquely identify a cell that is able to provide the app client 908b with access to the second edge system 920b. According to some other aspects, the coverage information 932 may include a set of TAIs, and each TAI may uniquely identify a set of cells (e.g., grouped together at the cellular network 912) that each is able to provide the app client 908b with access to the second edge system 920b.

The first edge system 920a may transmit the coverage information 932 to the source base station 902a. Correspondingly, the source base station 902a may receive the coverage information 932 in response to transmitting the information indicating the ID 928. Based on the received coverage information 932, the source base station 902a may determine one or more cells of the cellular network 912 that provide access to the second edge system 920b.

In order to determine which cells the source base station 902a should evaluate for handover the UE 904, the source base station 902a may first be informed of which neighboring cells are potential targets for handover of the UE 904. Thus, the lower layers 906 of the UE 904 may transmit a measurement report 930 to the source base station 902a. The measurement report 930 may indicate the measurements 924 performed by the lower layers 906 on the signaling 922a-b respectively received from the neighboring cells 910b-c that may be potential targets for handover of the UE 904.

Based on the measurement report 930 and the coverage information 932, the source base station 902a may determine whether the second edge system 920b is accessible through each of the neighboring cells 910b-c. For example, the source base station 902a may determine whether any of the neighboring cells 910b-c is associated with a CGI that matches a CGI included in the coverage information 932. For example, the source base station 902a may compare each of the CGIs associated with the neighboring cells 910b-c indicated in the measurement report 930 to each of the CGIs indicated in the set of cells in the coverage information 932. In another aspect, the source base station 902a may determine whether any of the neighboring cells 910b-c is located within a tracking area associated with a TAI that corresponds to a TAI included in the coverage information 932. For example, the source base station 902a may compare each of the TAIs associated with the neighboring cells 910b-c indicated in the measurement report 930 (e.g., the neighboring cells 910b-c may be associated with the same TAI) to each of the TAIs indicated in the coverage information 932.

If the coverage information 932 indicates that one or more of the neighboring cells 910b-c provides access to a second edge system 920b configured to deliver the edge application of the app client 908b, then the source base station 902a may prioritize the one or more cells corresponding to the coverage information 932 over any other cells that are absent from the coverage information 932 (e.g., cells that do not provide access to a second edge system 920b configured to deliver the edge application of the app client 908b).

If all of the neighboring cells 910b-c that are potential targets for UE handover either correspond to the coverage information 932 or do not correspond to the coverage information 932, then the source base station 902a may refrain from prioritizing any cells based on accessible of the second edge system 920b—for example, the source base station 902a may make a handover decision 934 based on the measurement report 930 and/or other UE mobility factors that are not contingent upon access to the edge application of the app client 908b.

However, if the coverage information 932 indicates that a first one of the neighboring cells 910b-c does provide access to a second edge system 920b configured to deliver the edge application of the app client 908b but a second one of the neighboring cells 910b-c does not, then the source base station 902a may prioritize the first neighboring cell 910b over the second neighboring cell 910c in the handover decision 934. By performing prioritization of the first neighboring cell 910b over the second neighboring cell 910c, the source base station 902a may increase the likelihood of selecting the first neighboring cell 910b as the target cell for handover rather than the second neighboring cell 910c.

In one aspect, the source base station 902a may prioritize the first neighboring cell 910b over the second neighboring cell 910c by weighting one or more of the measurements 924 indicated in the measurement report 930. In another aspect, if a first measurement associated with the first neighboring cell 910b is within a threshold amount of a second measurement associated with the second neighboring cell 910c, then the source base station 902a may preferentially select the first neighboring cell 910b as the handover target based on correspondence with the coverage information 932. Thus, the prioritized first neighboring cell 910b may be preferentially selected by the source base station 902a over the second neighboring cell 910c in the handover decision 934.

Based on the handover decision 934 in which the source base station 902a selects the first neighboring cell 910b as the handover target, the source base station 902a may generate an instruction 936 handing over the UE 904 to the first neighboring cell 910b. The instruction 936 may be a handover command indicating the first neighboring cell 910b as the handover target. Subsequently, the source base station 902a may transmit the instruction 936 to the UE 904.

Correspondingly, the lower layers 906 of the UE 904 may receive the instruction 936. The lower layers 906 may then establish a connection 938 with the first neighboring base station 902b based on the instruction 936. For example, the UE 904 (e.g., lower layers 906) may perform a contention-free RACH procedure with the first neighboring base station 902b. Consequently, the UE 904 may refrain from connecting with the second neighboring base station 902c that operates the second neighboring cell 910c.

Figure 10:
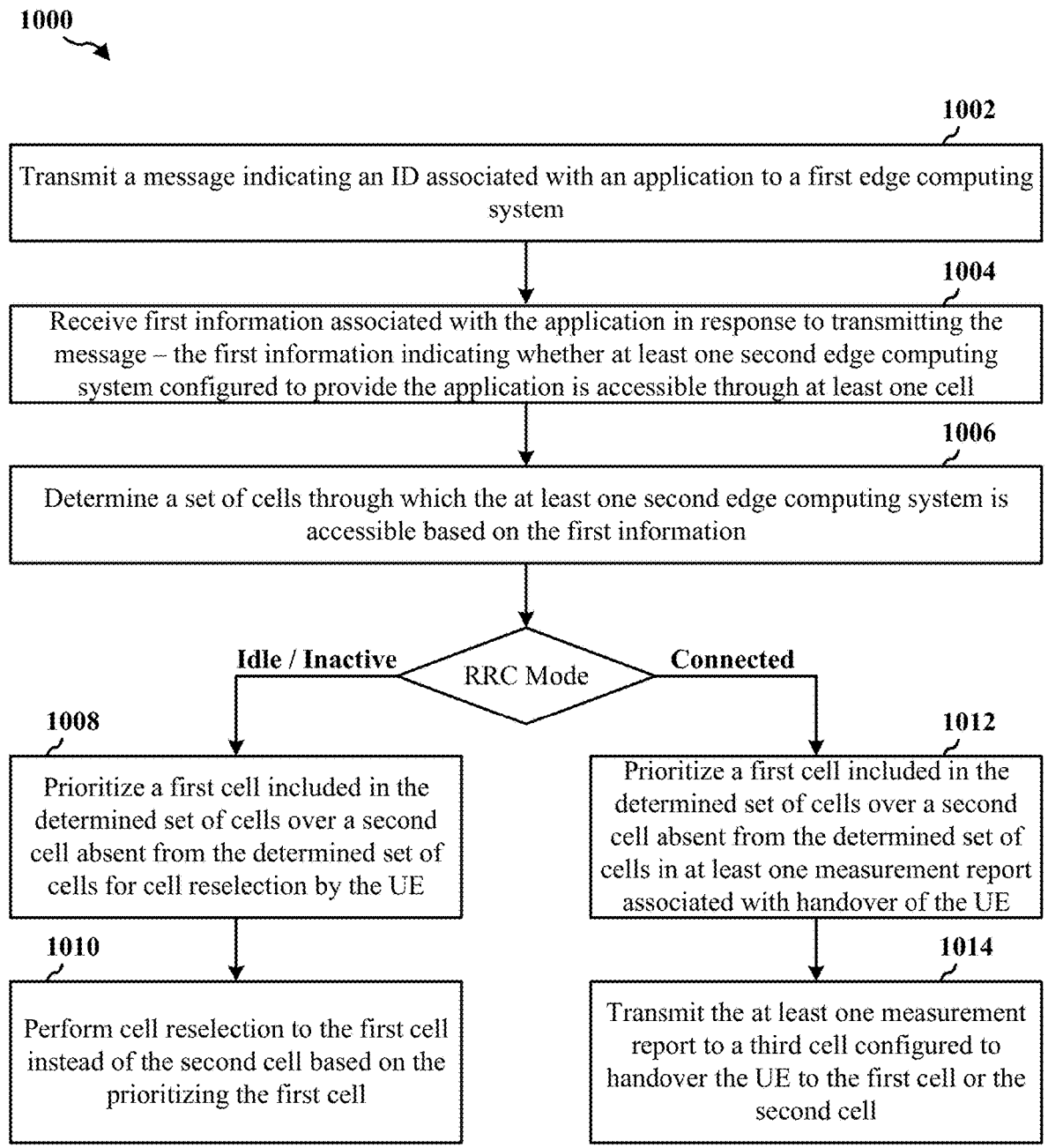
FIG. 10 is a flowchart of a method of wireless communication by a UE.

FIG. 10 is a flowchart of a method 1000 of wireless communication. The method 1000 may be performed by a UE (e.g., the UE 104, 350, 404, 504, 604, 704, 804, 904; a UE and/or apparatus that may include the memory 360 and which may be the entire UE 104, 404, 504, 604, 704, 804, 904 or a component of the UE 104, 350, 404, 504, 604, 704, 804, 904, such as the TX processor 368, the RX processor 356, and/or the controller/processor 359). According to various aspects, one or more operations of the method 1000 may be omitted, transposed, and/or contemporaneously performed.

At 1002, the UE may transmit a message indicating an ID associated with an application to a first edge computing system. The application may include a service or remote computing resource. The first edge computing system may include at least one of an Edge Data Network Configuration Server, an Edge Enabler Server, and/or an Edge Application Server configured to deliver the application. In one aspect, the message may include an HTTP/HTTPS GET request. In another aspect, the message may include a request associated with the application, such as a request to execute the application at the first edge computing system, when the UE is operating on a first cell.

At 1004, the UE may receive first information associated with the application in response to transmitting the message. The first information may indicate whether at least one second edge computing system configured to provide the application is accessible through at least one cell. In one aspect, the at least one cell may be the first cell on which the UE is operating, and the first information may indicate whether the request is able to be serviced or fulfilled by the second edge computing system, such as by execution of the application. In such an aspect, the first and second edge computing systems may be collocated and may include at least one of an Edge Enabler Server and/or an Edge Application Server configured to deliver the application. Illustratively, the first and second edge computing systems may be the same edge computing system when the first and second edge computing systems are collocated—e.g., the first and second edge computing systems may be the at least one of the Edge Enabler Server and/or the Edge Application Server.

In another aspect, the first information may indicate at least one of a set of CGIs associated with the set of cells through which the at least one second edge computing system is accessible and/or a set of TAIs associated with the set of cells through which the at least one second edge computing system is accessible. In such an aspect, the first edge computing system may include an Edge Data Network Configuration Server and the second edge computing system may be at least one of an Edge Enabler Server and/or an Edge Application Server.

At 1006, the UE may determine a set of cells through which the at least one second edge computing system is accessible based on the first information. In one aspect, the UE may determine the set of cells to include the first cell on which the UE is operating when first information indicates that the request is able to be serviced or fulfilled by the second edge computing system (e.g., when the first and second edge computing systems are collocated and/or are the same edge computing system), such as by execution of the application.

In another aspect, the set of cells through which the at least one second edge computing system is accessible may be determined to include the at least one cell when the first information indicates the at least one second edge computing system is accessible through the at least one cell. For example, the set of cells through which the at least one second edge computing system is accessible may be determined to include the at least one cell when the first information indicates a CGI and/or TAI corresponding to the at least one cell. However, the set of cells through which the at least one second edge computing system is accessible may be determined to exclude the at least one cell when the first information indicates the at least one second edge computing system is inaccessible through the at least one cell. For example, the set of cells through which the at least one second edge computing system is accessible may be determined to exclude or omit the at least one cell when the first information does not indicate a CGI and/or TAI corresponding to the at least one cell.

At 1008, if the UE is operating in an RRC Idle mode or an RRC inactive mode, the UE may prioritize a first cell included in the determined set of cells over a second cell absent from the determined set of cells for cell reselection by the UE. For example, the UE may apply an offset to at least one measurement associated with the cell reselection to the first cell or the second cell.

At 1010, if the UE is operating in an RRC Idle mode or an RRC inactive mode, the UE may perform cell selection or reselection to the first cell instead of the second cell based on the prioritizing the first cell. For example, the cell selection or reselection is performed to the first cell instead of the second cell based on the applying the offset.

At 1012, if the UE is operating in an RRC Connected Mode, the UE may prioritize a first cell included in the determined set of cells over a second cell absent from the determined set of cells in at least one measurement report associated with handover of the UE. For example, the UE may apply an offset to at least one measurement included in the at least one measurement report transmitted to the third cell.

At 1014, if the UE is operating in an RRC Connected Mode, the UE may transmit the at least one measurement report to a third cell configured to handover the UE to the first cell or the second cell. For example, the UE may be handed over to the first cell instead of the second cell based on applying the offset.

Figure 11:
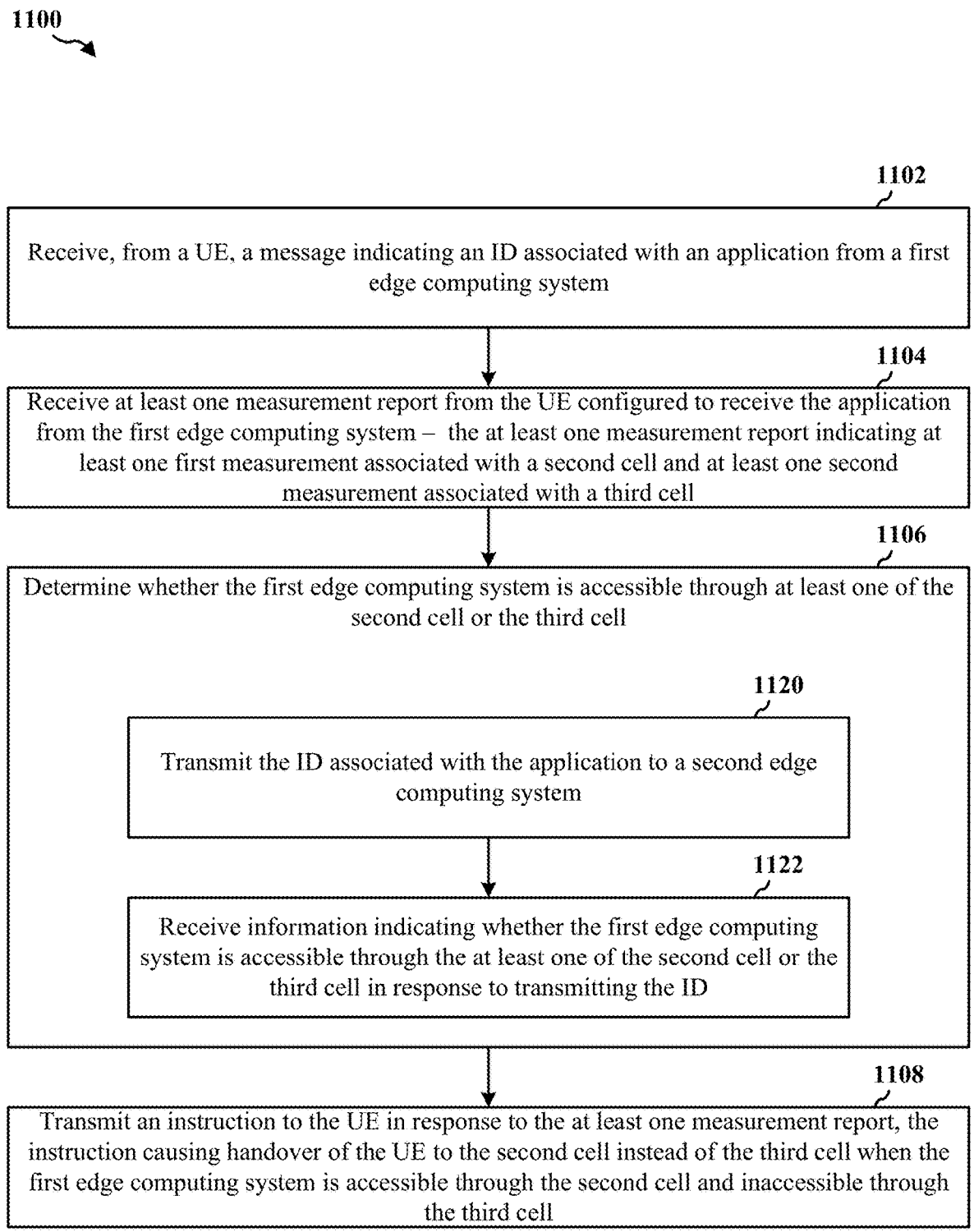
FIG. 11 is a flowchart of a method of wireless communication by a base station.

FIG. 11 is a flowchart of a method 1100 of wireless communication. The method may be performed by a base station (e.g., the base station 102/180, 310, 902a; a base station and/or apparatus that may include the memory 376 and which may be the entire base station 102/180, 310, 902a or a component of the base station 102/180, 310, 902a, such as the TX processor 316, the RX processor 370, and/or the controller/processor 375). According to various aspects, one or more operations of the method 1100 may be omitted, transposed, and/or contemporaneously performed.

At 1102, the base station may receive, from a UE, a message indicating an ID associated with an application from a first edge computing system. In one aspect, the first edge computing system may include at least one of an Edge Data Network Configuration Server, an Edge Enabler Server, and/or an Edge Application Server configured to deliver the application. In another aspect, the application may include a service and/or a remote computing resource.

At 1104, the base station may receive at least one measurement report from the UE configured to receive an application from a first edge computing system. The at least one measurement report may indicate at least one first measurement associated with a second cell and at least one second measurement associated with a third cell. For example, the first edge computing system may be accessible to the UE through the second cell and/or through the third cell.

At 1106, the base station may determine whether the first edge computing system is accessible through at least one of the second cell or the third cell. For example, the base station may determine whether the first edge computing system is accessible through the at least one of the second cell or the third cell based on the ID associated with the application. In one aspect, at 1120, the base station may transmit the ID associated with the application to a second edge computing system. The second edge computing system may include an Edge Data Network Configuration Server; at 1122, the base station may receive information indicating whether the first edge computing system is accessible through the at least one of the second cell or the third cell in response to transmitting the ID.

At 1108, the base station may transmit an instruction to the UE in response to the at least one measurement report. The instruction may cause handover of the UE to the second cell instead of the third cell when the first edge computing system is accessible through the second cell and inaccessible through the third cell.

Figure 12:
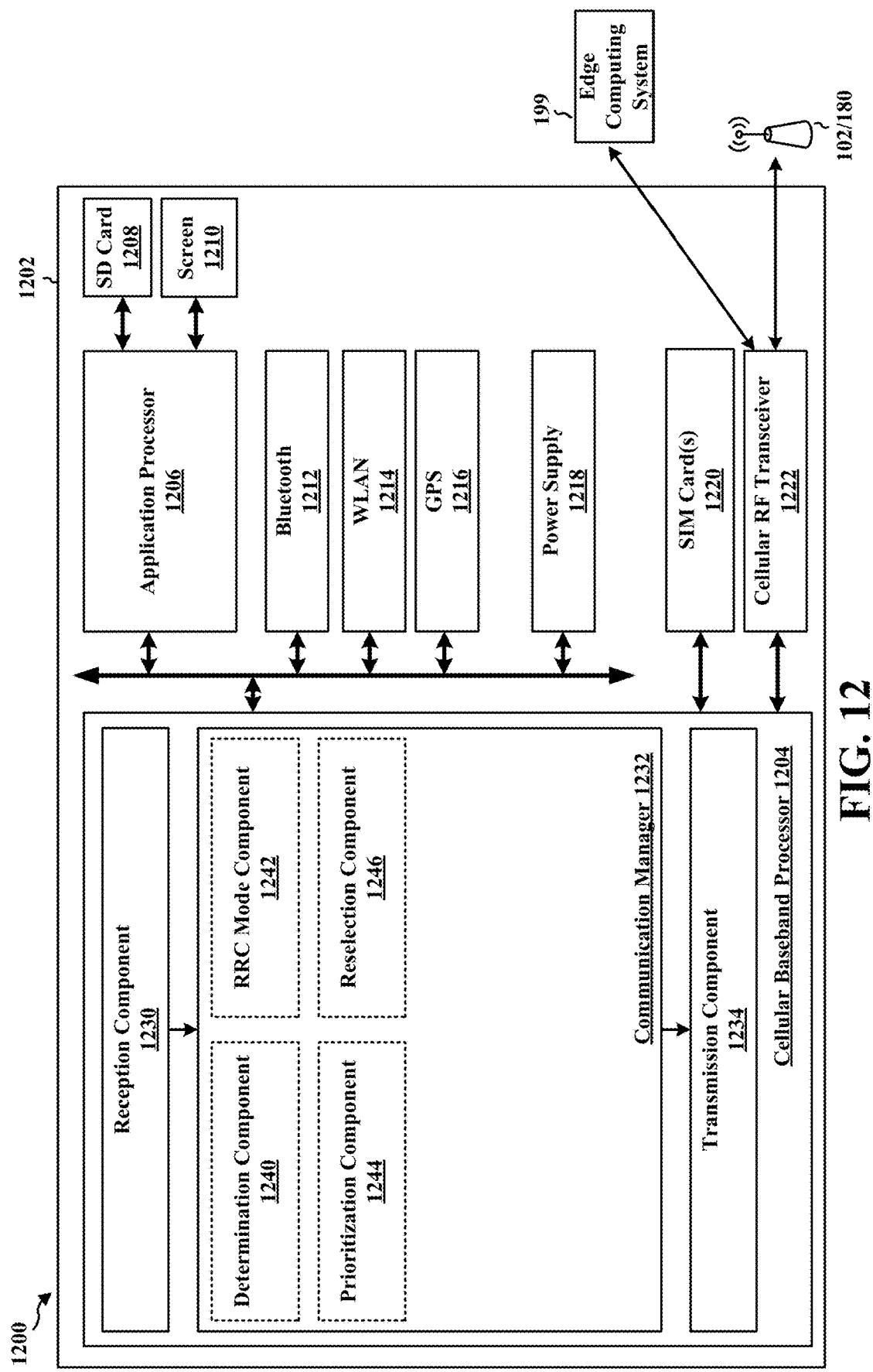
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or base station 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/ memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/ processor 359. In one configuration, the apparatus 1202 may be a modem chip and include just the baseband processor 1204, and in another configuration, the apparatus 1202 may be the entire UE (e.g., the UE 350 of FIG. 3) and include the aforediscussed additional modules of the apparatus 1202.

The transmission component 1234 may be configured to transmit a message indicating an ID associated with an application to a first edge computing system 199, e.g., as described in connection with 1002 of FIG. 10.

The reception component 1230 may be configured to receive first information associated with the application in response to transmitting the message—the first information indicating whether at least one second edge computing system configured to provide the application is accessible through at least one cell, e.g., as described in connection with 1004 of FIG. 10.

The communication manager 1232 includes a determination component 1240 that is configured to determine a set of cells through which the at least one second edge computing system is accessible based on the first information, e.g., as described in connection with 1006 of FIG. 10.

The communication manager 1232 further includes an RRC mode component 1242 that is configured to determine whether the apparatus 1202 is in an RRC Mode of Idle and/or Inactive or in an RRC Mode of Connected. The RRC mode component 1242 may provide the RRC mode to one or more other components of the apparatus 1202, such as a prioritization component 1244.

The communication manager 1232 further includes the prioritization component 1244. When the apparatus 1202 is in the RRC Mode of Idle and/or Inactive, the prioritization component 1244 may be configured to prioritize a first cell (e.g., provided by the base station 102/180) included in the determined set of cells over a second cell absent from the determined set of cells for cell reselection by the apparatus 1202, e.g., as described in connection with 1008 of FIG. 10.

The communication manager 1232 further includes a reselection component 1246 that receives input(s) indicating the first cell from the prioritization component 1244. The reselection component 1246 is configured to perform cell reselection to the first cell instead of the second cell based on the prioritizing the first cell, e.g., as described in connection with 1010 of FIG. 10.

When the apparatus 1202 is in the RRC Mode of Connected, the prioritization component 1244 may be configured to prioritize a first cell (e.g., provided by the base station 102/180) included in the determined set of cells over a second cell absent from the determined set of cells in at least one measurement report associated with handover of the apparatus 1202, e.g., as described in connection with 1012 of FIG. 10. The transmission component 1234 may then transmit the at least one measurement report to a third cell configured to handover the UE to the first cell or the second cell, e.g., as described in connection with 1014 of FIG. 10.

The apparatus 1202 may include additional components that perform some or all of the blocks, operations, signaling, etc. of the algorithm(s) in the aforementioned call flow diagrams and flowchart of FIGS. 5-10. As such, some or all of the blocks, operations, signaling, etc. in the aforementioned call flow diagrams and flowchart of FIGS. 5-10 may be performed by a component and the apparatus 1202 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for transmitting a message indicating an ID associated with an application to a first edge computing system; means for receiving first information associated with the application in response to transmitting the message, the first information indicating whether at least one second edge computing system configured to provide the application is accessible through at least one cell; and means for determining a set of cells through which the at least one second edge computing system is accessible based on the first information.

In one configuration, the message includes at least one of a HTTP GET request or an HTTPS GET request, and the first information is included in at least one of an HTTP response or an HTTPS response.

In one configuration, the first information includes at least one of a set of CGIs associated with the set of cells through which the at least one second edge computing system is accessible or a set of TAIs associated with the set of cells through which the at least one second edge computing system is accessible.

In one configuration, the message includes a request associated with the application, and the UE operates on the at least one cell when the application request is transmitted, and the first edge computing system and the at least one second edge computing system are collocated.

In one configuration, the collocated first edge computing system and at least one second edge computing system include at least one of an Edge Application Server or an Edge Enabler Server, and the means for determining of the set of cells is configured to: include the at least one cell on which the UE operates in the set of cells when the first information indicates that the at least one of the Edge Application Server or the Edge Enabler Server is accessible through the at least one cell; and omit the at least one cell on which the UE operates from the set of cells when the first information indicates that the at least one of the Edge Application Server or the Edge Enabler Server is inaccessible through the at least one cell.

In one configuration, the set of cells through which the at least one second edge computing system is accessible is determined to include the at least one cell when the first information indicates the at least one second edge computing system is accessible through the at least one cell, and the set of cells through which the at least one second edge computing system is accessible is determined to exclude the at least one cell when the first information indicates the at least one second edge computing system is inaccessible through the at least one cell.

In one configuration, the apparatus 1202, and in particular the cellular baseband processor 1204, includes means for prioritizing a first cell included in the determined set of cells over a second cell absent from the determined set of cells for cell reselection by the UE when the UE is operating in a RRC idle mode or RRC inactive mode; and means for performing cell selection or reselection to the first cell instead of the second cell based on the prioritizing the first cell.

In one configuration, the means for prioritizing the first cell is configured to: apply an offset to at least one measurement associated with the cell reselection to the first cell or the second cell, and the cell selection or reselection is performed to the first cell instead of the second cell based on the applying the offset.

In one configuration, the apparatus 1202, and in particular the cellular baseband processor 1204, includes means for prioritizing a first cell included in the determined set of cells over a second cell absent from the determined set of cells in at least one measurement report associated with handover of the UE when the UE is operating in a RRC connected mode; and means for transmitting the at least one measurement report to a third cell configured to handover the UE to the first cell or the second cell.

In one configuration, the means for prioritizing the first cell is configured to: apply an offset to at least one measurement included in the at least one measurement report transmitted to the third cell, and the UE is handed over to the first cell instead of the second cell based on the applying the offset.

In one configuration, the application includes a service or remote computing resource.

In one configuration, the first edge computing system includes an Edge Data Network Configuration Server, and the at least one second edge computing system includes at least one of an Edge Application Server or an Edge Enabler Server.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
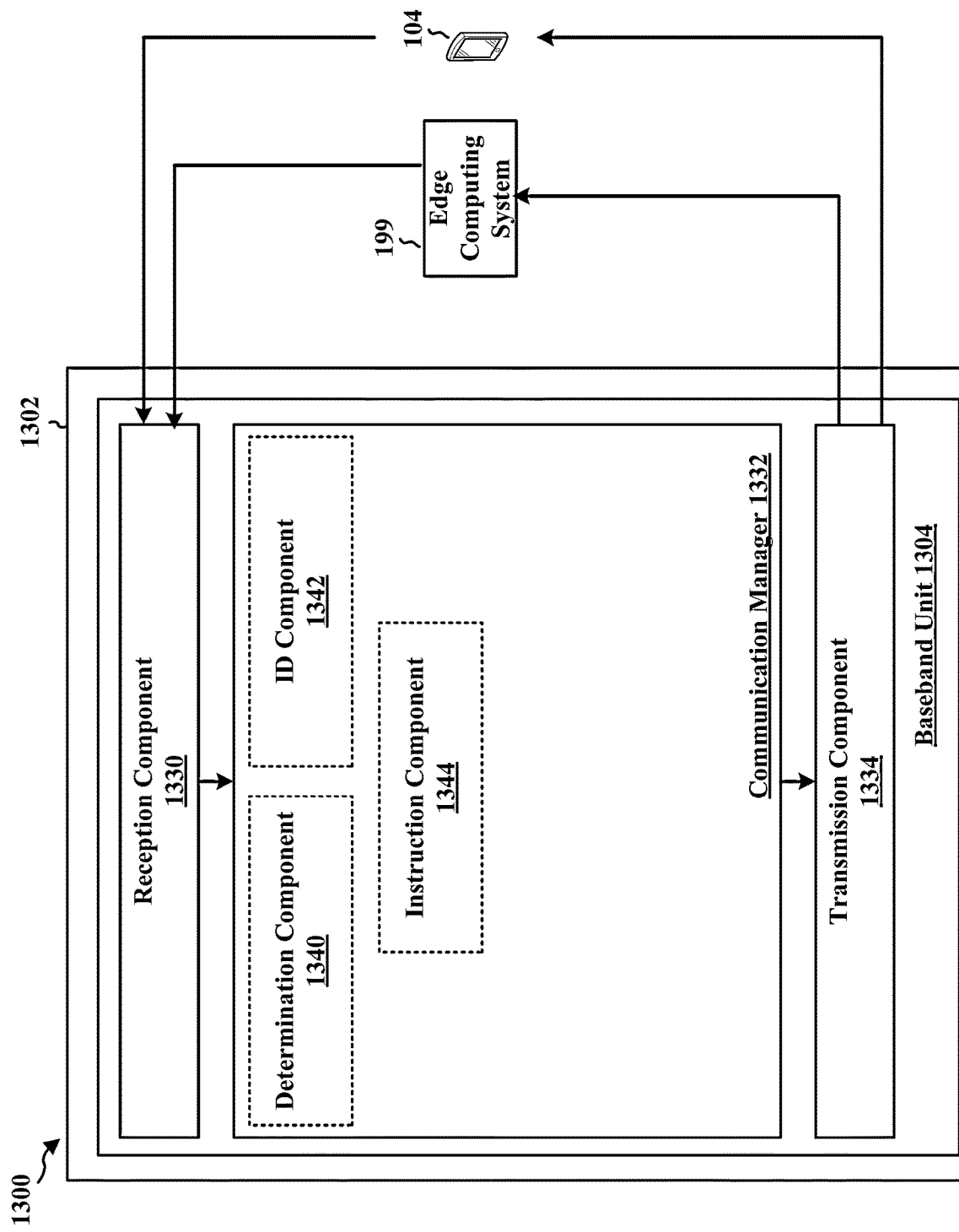
FIG. 13 is a diagram illustrating another example of a hardware implementation for another example apparatus.

FIG. 13 is a diagram 1300 illustrating an example of a hardware implementation for an apparatus 1302. The apparatus 1302 is a base station and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The reception component 1330 may be configured to receive from a UE 104, a message indicating an ID associated with an application from a first edge computing system 199, e.g., as described in connection with 1102 of FIG. 11.

The reception component 1330 may be further configured to receive at least one measurement report from the UE 104 configured to receive the application from the first edge computing system 199—the at least one measurement report indicating at least one first measurement associated with a second cell and at least one second measurement associated with a third cell, e.g., as described in connection with 1104 of FIG. 11.

The communication manager 1332 includes a determination component 1340 that determines whether the first edge computing system 199 is accessible through at least one of the second cell or the third cell, e.g., as described in connection with 1106 of FIG. 11. The communication manager 1332 further includes an ID component 1342 that transmits the ID associated with the application to a second edge computing system, e.g., as described in connection with 1120 of FIG. 11. The reception component 1330 may be further configured to receive information indicating whether the first edge computing system 199 is accessible through the at least one of the second cell or the third cell in response to transmitting the ID, e.g., as described in connection with 1122 of FIG. 11.

The communication manager 1332 further includes an instruction component 1344 that transmits an instruction to the UE 104 in response to the at least one measurement report, the instruction causing handover of the UE to the second cell instead of the third cell when the first edge computing system 199 is accessible through the second cell and inaccessible through the third cell, e.g., as described in connection with 1108 of FIG. 11.

The apparatus 1302 may include additional components that perform some or all of the blocks, operations, signaling, etc. of the algorithm(s) in the aforementioned call flow diagrams and flowchart of FIGS. 5-9 and 11. As such, some or all of the blocks, operations, signaling, etc. in the aforementioned call flow diagrams and flowchart of FIGS. 5-9 and 11 may be performed by a component and the apparatus 1302 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for receiving at least one measurement report from a UE configured to receive an application from a first edge computing system, the at least one measurement report indicating at least one first measurement associated with a second cell and at least one second measurement associated with a third cell; means for determining whether the first edge computing system is accessible through at least one of the second cell or the third cell; and means for transmitting an instruction to the UE in response to the at least one measurement report, the instruction causing handover of the UE to the second cell instead of the third cell when the first edge computing system is accessible through the second cell and inaccessible through the third cell.

In one configuration, the apparatus 1302, and in particular the baseband unit 1304, includes means for receiving, from the UE, a message indicating an ID associated with the application from the first edge computing system, and the determining whether the first edge computing system is accessible through the at least one of the second cell or the third cell is based on the ID associated with the application.

In one configuration, the means for determining whether the first edge computing system is accessible through the at least one of the second cell or the third cell is configured to: transmit the ID associated with the application to a second edge computing system; and receive information indicating whether the first edge computing system is accessible through the at least one of the second cell or the third cell in response to transmitting the ID.

In one configuration, the first edge computing system includes at least one of an Edge Application Server or an Edge Enabler Server, and the at least one second edge computing system includes an Edge Data Network Configuration Server.

In one configuration, the application includes a service or remote computing resource.

The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
    transmitting, by the UE, a message indicating an identifier (ID) associated with an application to a first edge computing system;
    receiving, by the UE, first information associated with the application in response to transmitting the message, the first information indicating that at least one second edge computing system configured to provide the application is accessible through at least a first cell; and
    prioritizing, by the UE and based on the first information, at least the first cell for selection over a least a second cell when utilizing the application.

2. The method of claim 1, wherein the message comprises at least one of a hypertext transfer protocol (HTTP) GET request or an HTTP Secure (HTTPS) GET request, and the first information is included in at least one of an HTTP response or an HTTPS response.

3. The method of claim 1, wherein the first information comprises at least one of a set of cell global identities (CGIs) associated with a set of cells through which the at least one second edge computing system is accessible or a set of tracking area identities (TAIs) associated with the set of cells through which the at least one second edge computing system is accessible.

4. The method of claim 1, wherein the message comprises a request associated with the application, and the UE operates on at least the first cell when the application request is transmitted, and wherein the first edge computing system and the at least one second edge computing system are collocated.

5. The method of claim 4, wherein the collocated first edge computing System and at least one second edge computing system comprise at least one of an Edge Application Server or an Edge Enabler Server, and wherein the prioritizing at least the first cell comprises generating edge area information including a set of cells at least in part by:
including at least the first cell in the set of cells based on the first information indicating that the at least one of the Edge Application Server or the Edge Enabler Server is accessible through at least the first cell; and
omitting at least the second cell from the set of cells when associated second information indicates that the at least one of the Edge Application Server or the Edge Enabler Server is inaccessible through at least the second cell.

6. The method of claim 1, wherein the prioritizing at least the first cell comprises generating edge area information including a set of cells through which the at least one second edge computing system is accessible,
wherein the set of cells includes first cell when the first information indicates the at least one second edge computing system is accessible through at least the first cell, and
wherein the set of cells excludes at least the second cell when associated second information indicates the at least one second edge computing system is inaccessible through at least the second cell.

7. The method of claim 1, wherein the selection includes cell selection or reselection by the UE when the UE is operating in a radio resource control (RRC) idle mode or RRC inactive mode.

8. The method of claim 7, wherein the prioritizing at least the first cell comprises:
applying an offset to at least one measurement associated with the cell reselection to at least the first cell or at least the second cell,
wherein the cell selection or reselection is performed to at least the first cell instead of at least the second cell based on the applying the offset.

9. The method of claim 1, wherein the prioritizing at least the first cell comprise:
prioritizing at least the first cell over at least the second cell in at least one measurement report associated with handover of the UE when the UE is operating in a radio resource control (RRC) connected mode; and
transmitting the at least one measurement report to a third cell configured to handover the UE to at least the first cell or at least the second cell.

10. The method of claim 9, wherein the prioritizing at least the first cell comprises:
applying an offset to at least one measurement included in the at least one measurement report transmitted to the third cell,
wherein the UE is handed over to at least the first cell instead of at least the second cell based on the applying the offset.

11. The method of claim 1, wherein the application comprises a service or remote computing resource.

12. The method of claim 1, wherein the first edge computing system comprises an Edge Data Network Configuration Server, and wherein the at least one second edge computing system comprises at least one of an Edge Application Server or an Edge Enabler Server.

13. A method of wireless communication by a base station configured to provide a first cell, the method comprising:
receiving, by the base station, at least one measurement report from a user equipment (UE) configured to receive an application from a first edge computing system, the at least one measurement report indicating at least one first measurement associated with a second cell and at least one second measurement associated with a third cell;
transmitting, by the base station and to a second edge computing system, an identifier (ID) associated with the application;
receiving, by the base station and from the second edge computing system, information indicating whether the first edge computing system is accessible through at least one of the second cell or the third cell; and
transmitting, by the base station, an instruction to the UE in response to the at least one measurement report, the instruction causing handover of the UE to the second cell instead of the third cell when the first edge computing system is accessible through the second cell and inaccessible through the third cell.

14. The method of claim 13, further comprising:
receiving, from the UE, a message indicating the ID associated with the application from the first edge computing system.

15. The method of claim 13, wherein the first edge computing system comprises at least one of an Edge Application Server or an Edge Enabler Server, and wherein the second edge computing system comprises an Edge Data Network Configuration Server.

16. The method of claim 13, wherein the application comprises a service or remote computing resource.

17. An apparatus for wireless communication by a user equipment (UE), comprising:
a memory; and
at least one processor coupled to the memory and configured to:
transmit a message indicating an identifier (ID) associated with an application to a first edge computing system;
receive first information associated with the application in response to transmitting the message, the first information indicating that at least one second edge computing system configured to provide the application is accessible through at least a first cell; and
prioritize, based on the first information, at least the first cell for selection over a least a second cell when utilizing the application.

18. The apparatus of claim 17, wherein the message comprises at least one of a hypertext transfer protocol (HTTP) GET request or an HTTP Secure (HTTPS) GET request, and the first information is included in at least one of an HTTP response or an HTTPS response.

19. The apparatus of claim 17, wherein the first information comprises at least one of a set of cell global identities (CGIs) associated with a set of cells through which the at least one second edge computing system is accessible or a set of tracking area identities (TAIs) associated with the set of cells through which the at least one second edge computing system is accessible.

20. The apparatus of claim 17, wherein the message comprises a request associated with the application, and the UE operates on at least the first cell when the application request is transmitted, and wherein the first edge computing system and the at least one second edge computing system are collocated.

21. The apparatus of claim 20, wherein the collocated first edge computing system and at least one second edge computing system comprise at least one of an Edge Application Server or an Edge Enabler Server, and wherein the prioritizing at least the first cell comprises generating edge area information including set of mils at least in part by:
    including at least the first cell in the set of cells based on the first information indicating that the at least one of the Edge Application Server or the Edge Enabler Server is accessible through at least the first cell; and
    omitting at least the second cell from the set of cells when associated second information indicates that the at least one of the Edge Application Server or the Edge Enabler Server is inaccessible through at least the second cell.

22. The apparatus of claim 17, wherein the prioritizing at least the first cell comprises generating edge area information including a set of cells through which the at least one second edge computing system is accessible,
    wherein the set of cells includes at least the first cell when the first information indicates the at least one second edge computing system is accessible through at least the first cell, and
    wherein the set of cells excludes at least the second cell when associated second information indicates the at least one second edge computing system is inaccessible through at least the second cell.

23. The apparatus of claim 17, wherein the selection includes
    cell selection or reselection by the UE when the UE is operating in a radio resource control (RRC) idle mode or RRC inactive mode.

24. The apparatus of claim 23, wherein the prioritizing at least the first cell comprises:
    applying an offset to at least one measurement associated with the cell reselection to at least the first cell or at least the second cell,
    wherein the cell selection or reselection is performed to at least the first cell instead of at least the second cell based on the applying the offset.

25. The apparatus of claim 17, wherein the prioritizing at least the first cell comprises:
    prioritizing at least the first cell over at least the second cell in at least one measurement report associated with handover of the UE when the UE is operating in a radio resource control (RRC) connected mode; and
    transmitting the at least one measurement report to a third cell configured to handover the UE to at least the first cell or at least the second cell.

26. The apparatus of claim 25, wherein the prioritizing at least the first cell comprises:
    applying an offset to at least one measurement included in the at least one measurement report transmitted to the third cell,
    wherein the UE is handed over to at least the first cell instead of at least the second cell based on the applying the offset.

27. An apparatus for wireless communication by a base station, comprising:
    a memory; and
    at least one processor coupled to the memory and configured to:
        receive at least one measurement report from a user equipment (UE) configured to receive an application from a first edge computing system, the at least one measurement report indicating at least one first measurement associated with a second cell and at least one second measurement associated with a third cell;
        transmit, to a second edge computing system, an identifier (ID) associated with the application;
        receive, by the base station and from the second edge computing system, information indicating whether the first edge computing system is accessible through at least one of the second cell or the third cell; and
        transmit an instruction to the UE in response to the at least one measurement report, the instruction causing handover of the UE to the second cell instead of the third cell when the first edge computing system is accessible through the second cell and inaccessible through the third cell.

28. The apparatus of claim 27, wherein the at least one processor is further configured to:
    receive, from the UE, a message indicating the ID associated with the application from the first edge computing system.

29. The apparatus of claim 27, wherein the first edge computing system comprises at least one of an Edge Application Server or an Edge Enabler Server, and wherein the second edge computing system comprises an Edge Data Network Configuration Server.

30. The apparatus of claim 27, wherein the application comprises a service or remote computing resource.

* * * * *